(12) United States Patent
Forstall et al.

(10) Patent No.: US 8,204,684 B2
(45) Date of Patent: Jun. 19, 2012

(54) ADAPTIVE MOBILE DEVICE NAVIGATION

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1030 days.

(21) Appl. No.: 11/970,766

(22) Filed: Jan. 8, 2008

(65) Prior Publication Data

US 2009/0005975 A1  Jan. 1, 2009

Related U.S. Application Data

(60) Provisional application No. 60/946,817, filed on Jun. 28, 2007.

(51) Int. Cl.
*G01C 21/34* (2006.01)
(52) U.S. Cl. ........ 701/433; 701/424; 701/425; 701/426; 701/431; 701/445; 701/500; 701/506; 701/541; 455/456.1; 455/456.5; 455/457
(58) Field of Classification Search .................. 701/207, 701/213, 214, 216, 217, 220; 455/456.1, 455/456.2, 456.3, 456.6, 457
See application file for complete search history.

(56) References Cited

U.S. PATENT DOCUMENTS

| | | | |
|---|---|---|---|
| 4,644,351 A | 2/1987 | Zabarsky et al. | |
| 4,903,212 A | 2/1990 | Yokouchi et al. | |
| 4,907,159 A | 3/1990 | Mauge et al. | |
| 4,999,783 A * | 3/1991 | Tenmoku et al. | 701/217 |
| 5,031,104 A | 7/1991 | Ikeda et al. | |
| 5,046,011 A * | 9/1991 | Kakihara et al. | 701/209 |
| 5,067,081 A | 11/1991 | Person | |
| 5,126,941 A | 6/1992 | Gurmu et al. | |
| 5,164,904 A | 11/1992 | Sumner | |
| 5,170,165 A | 12/1992 | Iihoshi et al. | |
| 5,173,691 A | 12/1992 | Sumner | |
| 5,182,555 A | 1/1993 | Sumner | |
| 5,187,810 A | 2/1993 | Toneyama et al. | |
| 5,195,031 A | 3/1993 | Ordish | |
| 5,208,763 A | 5/1993 | Hong et al. | |

(Continued)

FOREIGN PATENT DOCUMENTS

BR  9904979  12/2000

(Continued)

OTHER PUBLICATIONS

Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJ1b954T_DQn6gB; 1 page.

(Continued)

*Primary Examiner* — Thomas Black
*Assistant Examiner* — Peter D Nolan
(74) *Attorney, Agent, or Firm* — Fish & Richardson P.C.

(57) ABSTRACT

Adaptive mobile device navigation system, methods, and apparatus provide location information for a mobile device performing location estimation using dead reckoning. Multiple estimation modes can be selected including a mode for restricting measured movements to surrounding streets. Updated location fixes can be obtained through turn comparison with surrounding map information and user feedback. User feedback prompts can include photographs having geographic tag information corresponding to locations near an estimated location of the device.

24 Claims, 11 Drawing Sheets

U.S. PATENT DOCUMENTS

| | | | |
|---|---|---|---|
| 5,218,629 A | 6/1993 | Dumond, Jr. et al. | |
| 5,243,652 A | 9/1993 | Teare | |
| 5,274,560 A | 12/1993 | LaRue | |
| 5,289,572 A | 2/1994 | Yano et al. | |
| 5,295,064 A | 3/1994 | Malec et al. | |
| 5,307,278 A | 4/1994 | Hermans et al. | |
| 5,317,311 A | 5/1994 | Martell et al. | |
| 5,337,044 A | 8/1994 | Folger et al. | |
| 5,339,391 A | 8/1994 | Wroblewski et al. | |
| 5,371,678 A | 12/1994 | Nomura | |
| 5,374,933 A * | 12/1994 | Kao | 342/357.31 |
| 5,379,057 A | 1/1995 | Clough et al. | |
| 5,390,125 A | 2/1995 | Sennott et al. | |
| 5,406,490 A | 4/1995 | Braegas | |
| 5,416,712 A | 5/1995 | Geier et al. | |
| 5,416,890 A | 5/1995 | Beretta | |
| 5,469,362 A | 11/1995 | Hunt et al. | |
| 5,479,600 A | 12/1995 | Wroblewski et al. | |
| 5,504,482 A | 4/1996 | Schreder | |
| 5,508,707 A | 4/1996 | LeBlanc et al. | |
| 5,510,801 A | 4/1996 | Engelbrecht et al. | |
| 5,519,760 A | 5/1996 | Borkowski et al. | |
| 5,523,950 A | 6/1996 | Peterson | |
| 5,537,460 A | 7/1996 | Holliday, Jr. et al. | |
| 5,539,395 A | 7/1996 | Buss | |
| 5,539,647 A | 7/1996 | Shibata et al. | |
| 5,552,989 A | 9/1996 | Bertrand | |
| 5,559,520 A | 9/1996 | Barzeger et al. | |
| 5,570,412 A | 10/1996 | LeBlanc | |
| 5,598,572 A | 1/1997 | Tanikoshi et al. | |
| 5,627,547 A | 5/1997 | Ramaswamy et al. | |
| 5,627,549 A | 5/1997 | Park | |
| 5,628,050 A | 5/1997 | McGraw | |
| 5,630,206 A | 5/1997 | Urban et al. | |
| 5,636,245 A | 6/1997 | Ernst | |
| 5,642,303 A | 6/1997 | Small | |
| 5,646,853 A | 7/1997 | Takahashi et al. | |
| 5,654,908 A | 8/1997 | Yokoyama | |
| 5,663,732 A | 9/1997 | Stangeland et al. | |
| 5,675,362 A | 10/1997 | Clough et al. | |
| 5,675,573 A | 10/1997 | Karol et al. | |
| 5,677,837 A | 10/1997 | Reynolds | |
| 5,684,859 A | 11/1997 | Chanroo et al. | |
| 5,689,252 A | 11/1997 | Ayanoglu et al. | |
| 5,689,270 A | 11/1997 | Kelley et al. | |
| 5,689,431 A | 11/1997 | Rudow et al. | |
| 5,708,478 A | 1/1998 | Tognazzini | |
| 5,717,392 A | 2/1998 | Eldridge | |
| 5,732,074 A | 3/1998 | Spaur et al. | |
| 5,742,666 A | 4/1998 | Alpert | |
| 5,745,865 A | 4/1998 | Rostoker et al. | |
| 5,748,109 A | 5/1998 | Kosaka et al. | |
| 5,752,186 A | 5/1998 | Malackowski et al. | |
| 5,754,430 A * | 5/1998 | Sawada | 701/209 |
| 5,758,049 A | 5/1998 | Johnson et al. | |
| 5,760,773 A | 6/1998 | Berman et al. | |
| 5,767,795 A | 6/1998 | Schaphorst | |
| 5,774,824 A * | 6/1998 | Streit et al. | 701/207 |
| 5,774,829 A | 6/1998 | Cisneros et al. | |
| 5,793,630 A | 8/1998 | Theimer | |
| 5,796,365 A | 8/1998 | Lewis et al. | |
| 5,796,613 A * | 8/1998 | Kato et al. | 701/214 |
| 5,806,018 A | 9/1998 | Smith et al. | |
| 5,825,306 A | 10/1998 | Hiyokawa et al. | |
| 5,825,884 A | 10/1998 | Zdepski et al. | |
| 5,831,552 A | 11/1998 | Sogawa et al. | |
| 5,835,061 A | 11/1998 | Stewart | |
| 5,839,086 A | 11/1998 | Hirano | |
| 5,845,227 A | 12/1998 | Peterson | |
| 5,848,373 A | 12/1998 | DeLorme et al. | |
| 5,862,244 A | 1/1999 | Kleiner et al. | |
| 5,867,110 A | 2/1999 | Naito et al. | |
| 5,870,686 A | 2/1999 | Monson | |
| 5,872,526 A | 2/1999 | Tognazzini | |
| 5,873,068 A | 2/1999 | Beaumont et al. | |
| 5,883,580 A | 3/1999 | Briancon | |
| 5,887,269 A | 3/1999 | Brunts et al. | |
| 5,892,454 A | 4/1999 | Schipper et al. | |
| 5,893,898 A | 4/1999 | Tanimoto | |
| 5,898,680 A | 4/1999 | Johnstone | |
| 5,899,954 A * | 5/1999 | Sato | 701/207 |
| 5,905,451 A | 5/1999 | Sakashita | |
| 5,908,465 A | 6/1999 | Ito et al. | |
| 5,910,799 A | 6/1999 | Carpenter | |
| 5,923,861 A | 7/1999 | Bertram et al. | |
| 5,933,094 A | 8/1999 | Goss et al. | |
| 5,933,100 A | 8/1999 | Golding | |
| 5,936,572 A | 8/1999 | Loomis et al. | |
| 5,938,721 A | 8/1999 | Dussell et al. | |
| 5,941,930 A | 8/1999 | Morimoto et al. | |
| 5,941,934 A * | 8/1999 | Sato | 701/217 |
| 5,946,618 A | 8/1999 | Agre et al. | |
| 5,948,040 A | 9/1999 | DeLorme et al. | |
| 5,948,041 A | 9/1999 | Abo et al. | |
| 5,948,061 A | 9/1999 | Merriman et al. | |
| 5,955,973 A | 9/1999 | Anderson | |
| 5,959,577 A | 9/1999 | Fan | |
| 5,959,580 A | 9/1999 | Maloney et al. | |
| 5,968,109 A | 10/1999 | Israni et al. | |
| 5,969,678 A | 10/1999 | Stewart | |
| 5,982,298 A | 11/1999 | Lappenbusch et al. | |
| 5,982,324 A | 11/1999 | Watters et al. | |
| 5,987,381 A | 11/1999 | Oshizawa | |
| 5,991,692 A | 11/1999 | Spencer, II et al. | |
| 5,999,126 A | 12/1999 | Ito | |
| 6,002,932 A | 12/1999 | Kingdon et al. | |
| 6,002,936 A | 12/1999 | Roel-Ng et al. | |
| 6,005,928 A | 12/1999 | Johnson | |
| 6,014,090 A | 1/2000 | Rosen et al. | |
| 6,014,607 A | 1/2000 | Yagyu et al. | |
| 6,023,653 A * | 2/2000 | Ichimura et al. | 701/208 |
| 6,026,375 A | 2/2000 | Hall et al. | |
| 6,028,550 A | 2/2000 | Froeberg et al. | |
| 6,029,069 A | 2/2000 | Takaki | |
| 6,031,490 A | 2/2000 | Forssen et al. | |
| 6,041,280 A | 3/2000 | Kohli et al. | |
| 6,052,645 A | 4/2000 | Harada | |
| 6,058,350 A | 5/2000 | Ihara | |
| 6,064,335 A | 5/2000 | Eschenbach | |
| 6,067,502 A | 5/2000 | Hayashida et al. | |
| 6,069,570 A | 5/2000 | Herring | |
| 6,073,013 A | 6/2000 | Agre et al. | |
| 6,073,062 A | 6/2000 | Hoshino et al. | |
| 6,076,041 A | 6/2000 | Watanabe | |
| 6,078,818 A | 6/2000 | Kingdon et al. | |
| 6,081,206 A | 6/2000 | Kielland | |
| 6,085,090 A | 7/2000 | Yee et al. | |
| 6,085,148 A | 7/2000 | Jamison | |
| 6,087,965 A | 7/2000 | Murphy | |
| 6,088,594 A | 7/2000 | Kingdon et al. | |
| 6,091,956 A | 7/2000 | Hollenberg | |
| 6,091,957 A | 7/2000 | Larkins | |
| 6,092,076 A | 7/2000 | McDonough et al. | |
| 6,094,607 A | 7/2000 | Diesel | |
| 6,101,443 A | 8/2000 | Kato | |
| 6,104,931 A | 8/2000 | Havinis et al. | |
| 6,108,555 A | 8/2000 | Maloney et al. | |
| 6,111,541 A | 8/2000 | Karmel | |
| 6,115,611 A | 9/2000 | Kimoto et al. | |
| 6,115,754 A | 9/2000 | Landgren | |
| 6,119,014 A | 9/2000 | Alperovich et al. | |
| 6,122,520 A | 9/2000 | Want et al. | |
| 6,127,945 A | 10/2000 | Mura-Smith | |
| 6,128,482 A | 10/2000 | Nixon et al. | |
| 6,128,571 A | 10/2000 | Ito et al. | |
| 6,134,548 A | 10/2000 | Gottsman et al. | |
| 6,138,003 A | 10/2000 | Kingdon et al. | |
| 6,138,142 A | 10/2000 | Linsk | |
| 6,140,957 A * | 10/2000 | Wilson et al. | 342/357.32 |
| 6,151,309 A | 11/2000 | Busuioc et al. | |
| 6,151,498 A | 11/2000 | Roel-Ng et al. | |
| 6,154,152 A | 11/2000 | Ito | |
| 6,157,381 A | 12/2000 | Bates et al. | |
| 6,157,841 A | 12/2000 | Bolduc et al. | |
| 6,163,749 A | 12/2000 | McDonough et al. | |
| 6,166,627 A | 12/2000 | Reeley | |
| 6,167,266 A | 12/2000 | Havinis et al. | |

| | | |
|---|---|---|
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 * | 2/2001 | Schupfner ............... 701/217 |
| 6,195,557 B1 | 2/2001 | Havinis et al. |
| 6,195,609 B1 | 2/2001 | Pilley et al. |
| 6,199,014 B1 | 3/2001 | Walker |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 * | 8/2001 | Chowdhary ............... 701/220 |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,339,437 B1 | 1/2002 | Nielsen |
| 6,339,746 B1 * | 1/2002 | Sugiyama et al. ............ 701/209 |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,356,763 B1 | 3/2002 | Kangas et al. |
| 6,356,836 B1 | 3/2002 | Adolph |
| 6,356,838 B1 | 3/2002 | Paul |
| 6,370,629 B1 | 4/2002 | Hastings et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,032 B1 | 6/2002 | Jamison |
| 6,405,034 B1 | 6/2002 | Tijerino |
| 6,405,123 B1 | 6/2002 | Rennar et al. |
| 6,411,899 B2 | 6/2002 | Dussell et al. |
| 6,414,635 B1 | 7/2002 | Stewart et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,449,485 B1 | 9/2002 | Anzil |
| 6,452,498 B2 | 9/2002 | Stewart |
| 6,456,234 B1 | 9/2002 | Johnson et al. |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,501,421 B1 | 12/2002 | Dutta et al. |
| 6,505,046 B1 | 1/2003 | Baker |
| 6,505,048 B1 | 1/2003 | Moles et al. |
| 6,505,123 B1 | 1/2003 | Root et al. |
| 6,507,802 B1 | 1/2003 | Payton et al. |
| 6,516,197 B2 | 2/2003 | Havinis et al. |
| 6,519,463 B2 | 2/2003 | Tendler |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,545,638 B2 * | 4/2003 | Sladen ............... 342/357.32 |
| 6,546,336 B1 * | 4/2003 | Matsuoka et al. ........... 701/213 |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,574,550 B2 * | 6/2003 | Hashida ............... 701/207 |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 * | 11/2003 | Brodie et al. ............... 701/216 |
| 6,647,257 B2 | 11/2003 | Owensby |
| 6,650,902 B1 | 11/2003 | Richton |
| 6,650,997 B2 | 11/2003 | Funk |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,677,894 B2 | 1/2004 | Sheynblat et al. |
| 6,679,932 B2 | 1/2004 | Birler et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,697,734 B1 | 2/2004 | Suomela |
| 6,711,408 B1 | 3/2004 | Raith |
| 6,711,474 B1 | 3/2004 | Treyz et al. |
| 6,718,344 B2 | 4/2004 | Hirono |
| 6,721,572 B1 | 4/2004 | Smith et al. |
| 6,731,236 B1 | 5/2004 | Hager et al. |
| 6,731,238 B2 | 5/2004 | Johnson |
| 6,738,808 B1 | 5/2004 | Zellner et al. |
| 6,741,188 B1 | 5/2004 | Miller et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,766,245 B2 * | 7/2004 | Padmanabhan ............... 701/207 |
| 6,782,278 B2 | 8/2004 | Chen et al. |
| 6,789,012 B1 | 9/2004 | Childs et al. |
| 6,795,686 B2 | 9/2004 | Master et al. |
| 6,801,855 B1 * | 10/2004 | Walters et al. ............... 701/216 |
| 6,810,323 B1 | 10/2004 | Bullock et al. |
| 6,813,501 B2 | 11/2004 | Kinnunen et al. |

| Patent No. | Date | Inventor(s) | | Patent No. | Date | Inventor(s) |
|---|---|---|---|---|---|---|
| 6,813,503 B1 | 11/2004 | Zillikens et al. | | 7,359,713 B1 | 4/2008 | Tiwari |
| 6,816,782 B1 | 11/2004 | Walters et al. | | 7,370,283 B2 | 5/2008 | Othmer |
| 6,819,919 B1 | 11/2004 | Tanaka | | 7,373,246 B2 | 5/2008 | O'Clair |
| 6,823,188 B1 | 11/2004 | Stern | | 7,386,396 B2 | 6/2008 | Johnson |
| 6,845,318 B1 | 1/2005 | Moore et al. | | 7,389,179 B2 | 6/2008 | Jin et al. |
| 6,847,891 B2 | 1/2005 | Pietras et al. | | 7,392,017 B2 | 6/2008 | Chu et al. |
| 6,847,969 B1 | 1/2005 | Mathai et al. | | 7,395,031 B1 | 7/2008 | Ritter |
| 6,853,911 B1 | 2/2005 | Sakarya | | 7,418,402 B2 | 8/2008 | McCrossin et al. |
| 6,853,917 B2 | 2/2005 | Miwa | | 7,421,422 B1 | 9/2008 | Dempster et al. |
| 6,859,149 B1 | 2/2005 | Ohta | | 7,421,486 B1 | 9/2008 | Parupudi et al. |
| 6,865,483 B1 | 3/2005 | Cook, III et al. | | 7,426,437 B2 | 9/2008 | Breed et al. |
| 6,868,074 B1 | 3/2005 | Hanson | | 7,427,021 B2 | 9/2008 | Kemper et al. |
| 6,871,144 B1 | 3/2005 | Lee | | 7,433,694 B2 | 10/2008 | Morgan et al. |
| 6,882,313 B1 | 4/2005 | Fan et al. | | 7,440,842 B1 | 10/2008 | Vorona |
| 6,888,536 B2 | 5/2005 | Westerman et al. | | 7,483,944 B2 | 1/2009 | Parupudi et al. |
| 6,909,902 B1 | 6/2005 | Sawada et al. | | 7,486,201 B2 | 2/2009 | Kelly et al. |
| 6,912,398 B1 | 6/2005 | Domnitz | | 7,500,607 B2 | 3/2009 | Williams |
| 6,914,626 B2 | 7/2005 | Squibbs | | 7,512,487 B1 | 3/2009 | Golding et al. |
| 6,915,208 B1 | 7/2005 | Garin et al. | | 7,522,927 B2 | 4/2009 | Fitch et al. |
| 6,931,322 B2 * | 8/2005 | Jung et al. ............... 701/216 | | 7,525,484 B2 | 4/2009 | Dupray et al. |
| 6,933,841 B2 | 8/2005 | Muramatsu et al. | | 7,545,281 B2 | 6/2009 | Richards et al. |
| 6,944,447 B2 | 9/2005 | Portman et al. | | 7,558,696 B2 | 7/2009 | Vilppula et al. |
| 6,948,656 B2 | 9/2005 | Williams | | 7,565,132 B2 | 7/2009 | Ben Ayed |
| 6,952,181 B2 | 10/2005 | Karr et al. | | 7,565,157 B1 | 7/2009 | Ortega et al. |
| 6,954,735 B2 | 10/2005 | Djupsjobacka et al. | | 7,574,222 B2 | 8/2009 | Sawada et al. |
| 6,957,072 B2 | 10/2005 | Kangras et al. | | 7,577,448 B2 | 8/2009 | Pande et al. |
| 6,975,959 B2 | 12/2005 | Dietrich et al. | | 7,587,345 B2 | 9/2009 | Mann et al. |
| 6,980,909 B2 | 12/2005 | Root et al. | | 7,599,795 B1 | 10/2009 | Blumberg et al. |
| 6,990,495 B1 | 1/2006 | Grason et al. | | 7,603,233 B2 * | 10/2009 | Tashiro ............... 701/214 |
| 6,999,779 B1 | 2/2006 | Hashimoto | | 7,606,580 B2 * | 10/2009 | Granito et al. ............. 455/456.1 |
| 7,003,289 B1 | 2/2006 | Kolls | | 7,617,044 B2 * | 11/2009 | Lee ............... 701/209 |
| 7,009,556 B2 | 3/2006 | Stewart | | 7,620,404 B2 | 11/2009 | Chesnais et al. |
| 7,031,725 B2 | 4/2006 | Rorabaugh | | 7,623,848 B2 | 11/2009 | Rosenfelt et al. |
| 7,044,372 B2 | 5/2006 | Okuda et al. | | 7,624,358 B2 | 11/2009 | Kim et al. |
| 7,058,594 B2 | 6/2006 | Stewart | | 7,647,174 B2 * | 1/2010 | Kwon ............... 701/214 |
| 7,076,255 B2 | 7/2006 | Parupudi et al. | | 7,680,591 B2 * | 3/2010 | Nagata et al. ............... 701/207 |
| 7,082,365 B2 | 7/2006 | Sheha et al. | | 7,689,916 B1 | 3/2010 | Goel et al. |
| 7,089,264 B1 | 8/2006 | Guido et al. | | 7,710,290 B2 | 5/2010 | Johnson |
| 7,096,029 B1 | 8/2006 | Parupudi et al. | | 7,711,478 B2 | 5/2010 | Gluck |
| 7,096,030 B2 | 8/2006 | Huomo | | 7,714,778 B2 | 5/2010 | Dupray |
| 7,103,470 B2 | 9/2006 | Mintz | | 7,743,074 B1 | 6/2010 | Parupudi et al. |
| 7,117,015 B2 | 10/2006 | Scheinert et al. | | 7,756,639 B2 * | 7/2010 | Colley et al. ............... 701/213 |
| 7,120,469 B1 | 10/2006 | Urakawa | | 7,768,395 B2 | 8/2010 | Gold |
| 7,123,189 B1 | 10/2006 | Lalik et al. | | 7,792,273 B2 | 9/2010 | Fano et al. |
| 7,123,926 B2 | 10/2006 | Himmelstein | | 7,811,203 B2 * | 10/2010 | Unuma et al. ............... 482/8 |
| 7,146,298 B2 | 12/2006 | Motamedi et al. | | 7,848,388 B2 | 12/2010 | Tudosoiu |
| 7,151,921 B2 | 12/2006 | Otsuka | | 7,848,765 B2 | 12/2010 | Phillips et al. |
| 7,165,725 B2 | 1/2007 | Casey | | 7,860,758 B2 | 12/2010 | McCrossin et al. |
| 7,171,190 B2 | 1/2007 | Ye et al. | | 7,890,123 B2 * | 2/2011 | Granito et al. ............. 455/456.1 |
| 7,181,189 B2 | 2/2007 | Hotta et al. | | 7,933,612 B2 | 4/2011 | Counts et al. |
| 7,187,997 B2 | 3/2007 | Johnson | | 7,933,929 B1 | 4/2011 | McClendon et al. |
| 7,200,409 B1 | 4/2007 | Ichikawa et al. | | 2001/0018349 A1 | 8/2001 | Kinnunen et al. |
| 7,200,566 B1 | 4/2007 | Moore et al. | | 2001/0046884 A1 | 11/2001 | Yoshioka |
| 7,213,048 B1 | 5/2007 | Parupudi et al. | | 2002/0032035 A1 | 3/2002 | Teshima |
| 7,215,967 B1 | 5/2007 | Kransmo et al. | | 2002/0035493 A1 | 3/2002 | Mozayeny et al. |
| 7,236,883 B2 | 6/2007 | Garin et al. | | 2002/0035609 A1 | 3/2002 | Lessard et al. |
| 7,254,481 B2 | 8/2007 | Yamada et al. | | 2002/0042266 A1 | 4/2002 | Heyward et al. |
| 7,256,711 B2 | 8/2007 | Sheha et al. | | 2002/0046069 A1 | 4/2002 | Mozayeny et al. |
| 7,257,392 B2 | 8/2007 | Tang et al. | | 2002/0046077 A1 | 4/2002 | Mozayeny et al. |
| 7,260,378 B2 | 8/2007 | Holland et al. | | 2002/0046084 A1 | 4/2002 | Steele et al. |
| 7,266,376 B2 | 9/2007 | Nakagawa | | 2002/0067353 A1 | 6/2002 | Kenyon et al. |
| 7,269,601 B2 | 9/2007 | Kinno et al. | | 2002/0077144 A1 | 6/2002 | Keller et al. |
| 7,271,765 B2 | 9/2007 | Stilp et al. | | 2002/0087505 A1 | 7/2002 | Smith et al. |
| 7,272,404 B2 | 9/2007 | Overy et al. | | 2002/0091991 A1 | 7/2002 | Castro |
| 7,274,332 B1 | 9/2007 | Dupray | | 2002/0095486 A1 | 7/2002 | Bahl |
| 7,274,939 B2 | 9/2007 | Ruutu et al. | | 2002/0126146 A1 | 9/2002 | Burns et al. |
| 7,280,822 B2 | 10/2007 | Fraccaroli | | 2002/0128773 A1 | 9/2002 | Chowanic et al. |
| 7,286,933 B2 * | 10/2007 | Cho ............... 701/216 | | 2002/0132625 A1 | 9/2002 | Ogino et al. |
| 7,295,556 B2 | 11/2007 | Roese et al. | | 2002/0140560 A1 | 10/2002 | Altman et al. |
| 7,295,925 B2 | 11/2007 | Breed et al. | | 2002/0160815 A1 | 10/2002 | Patel et al. |
| 7,298,327 B2 | 11/2007 | Dupray et al. | | 2002/0167442 A1 | 11/2002 | Taylor |
| 7,299,008 B2 | 11/2007 | Gluck | | 2002/0173905 A1 * | 11/2002 | Jin et al. ............... 701/207 |
| 7,310,516 B1 | 12/2007 | Vacanti | | 2003/0014181 A1 | 1/2003 | Myr |
| 7,313,467 B2 | 12/2007 | Breed et al. | | 2003/0016804 A1 | 1/2003 | Sheha et al. |
| 7,319,412 B1 | 1/2008 | Coppinger et al. | | 2003/0032404 A1 | 2/2003 | Wager et al. |
| 7,336,949 B2 | 2/2008 | Nasielski | | 2003/0055560 A1 | 3/2003 | Phillips et al. |
| 7,339,496 B2 | 3/2008 | Endo et al. | | 2003/0060212 A1 | 3/2003 | Thomas |
| 7,343,564 B2 | 3/2008 | Othmer | | 2003/0060215 A1 | 3/2003 | Graham |
| 7,349,706 B2 | 3/2008 | Kim et al. | | 2003/0060973 A1 | 3/2003 | Mathews et al. |

| | | | | | | |
|---|---|---|---|---|---|---|
| 2003/0060976 A1 | 3/2003 | Sato et al. | | 2005/0222756 A1 | 10/2005 | Davis et al. |
| 2003/0065934 A1 | 4/2003 | Angelo et al. | | 2005/0222763 A1 | 10/2005 | Uyeki |
| 2003/0069683 A1 | 4/2003 | Lapidot et al. | | 2005/0227709 A1 | 10/2005 | Chang et al. |
| 2003/0078054 A1 | 4/2003 | Okuda | | 2005/0228860 A1 | 10/2005 | Hamynen et al. |
| 2003/0078055 A1 | 4/2003 | Smith et al. | | 2005/0234637 A1 | 10/2005 | Obradovich et al. |
| 2003/0078057 A1 | 4/2003 | Watanabe et al. | | 2005/0239477 A1 | 10/2005 | Kim et al. |
| 2003/0096620 A1 | 5/2003 | Ozturk et al. | | 2005/0250440 A1 | 11/2005 | Zhou et al. |
| 2003/0100326 A1 | 5/2003 | Grube et al. | | 2005/0256639 A1 | 11/2005 | Aleksic et al. |
| 2003/0100334 A1 | 5/2003 | Mazzara, Jr. | | 2005/0286421 A1 | 12/2005 | Janacek |
| 2003/0101225 A1 | 5/2003 | Han et al. | | 2006/0009908 A1 | 1/2006 | Tomita et al. |
| 2003/0134657 A1 | 7/2003 | Norta et al. | | 2006/0015249 A1 | 1/2006 | Gieseke |
| 2003/0140136 A1 | 7/2003 | Nakamura | | 2006/0022048 A1 | 2/2006 | Johnson |
| 2003/0144793 A1 | 7/2003 | Melaku et al. | | 2006/0025158 A1 | 2/2006 | Leblanc et al. |
| 2003/0148774 A1 | 8/2003 | Naghian et al. | | 2006/0038719 A1 | 2/2006 | Pande et al. |
| 2003/0158655 A1 | 8/2003 | Obradovich et al. | | 2006/0041374 A1 | 2/2006 | Inoue |
| 2003/0191578 A1 | 10/2003 | Paulauskas et al. | | 2006/0041377 A1 | 2/2006 | Jung et al. |
| 2003/0236106 A1 | 12/2003 | Master et al. | | 2006/0041378 A1 | 2/2006 | Cheng et al. |
| 2004/0010358 A1 | 1/2004 | Oesterling et al. | | 2006/0056388 A1 | 3/2006 | Livingood |
| 2004/0036649 A1 | 2/2004 | Taylor | | 2006/0058955 A1 | 3/2006 | Mehren |
| 2004/0054428 A1 | 3/2004 | Sheha et al. | | 2006/0063539 A1 | 3/2006 | Beyer, Jr. |
| 2004/0059502 A1 | 3/2004 | Levi et al. | | 2006/0069503 A1 | 3/2006 | Suomela |
| 2004/0068439 A1 | 4/2004 | Elgrably | | 2006/0085392 A1 | 4/2006 | Wang et al. |
| 2004/0072577 A1 | 4/2004 | Myllymaki et al. | | 2006/0094353 A1 | 5/2006 | Nielson et al. |
| 2004/0073361 A1 | 4/2004 | Tzamaloukas et al. | | 2006/0101005 A1 | 5/2006 | Yang et al. |
| 2004/0083050 A1 | 4/2004 | Biyani | | 2006/0111122 A1 | 5/2006 | Carlson et al. |
| 2004/0098175 A1* | 5/2004 | Said et al. ............. 701/1 | | 2006/0116137 A1 | 6/2006 | Jung |
| 2004/0104842 A1 | 6/2004 | Drury et al. | | 2006/0148463 A1 | 7/2006 | Zhu et al. |
| 2004/0128067 A1 | 7/2004 | Smith | | 2006/0150119 A1 | 7/2006 | Chesnais et al. |
| 2004/0151151 A1 | 8/2004 | Kubler et al. | | 2006/0166679 A1 | 7/2006 | Karaoguz et al. |
| 2004/0158401 A1 | 8/2004 | Yoon | | 2006/0172769 A1 | 8/2006 | Oh |
| 2004/0158584 A1 | 8/2004 | Necsoiu et al. | | 2006/0172778 A1 | 8/2006 | Sundararajan et al. |
| 2004/0172409 A1 | 9/2004 | James | | 2006/0179114 A1 | 8/2006 | Deeds |
| 2004/0176907 A1 | 9/2004 | Nesbitt | | 2006/0180649 A1 | 8/2006 | Casey |
| 2004/0180669 A1 | 9/2004 | Kall | | 2006/0184978 A1 | 8/2006 | Casey |
| 2004/0192299 A1 | 9/2004 | Wilson et al. | | 2006/0195481 A1 | 8/2006 | Arrouye et al. |
| 2004/0198335 A1 | 10/2004 | Campen | | 2006/0199567 A1 | 9/2006 | Alston |
| 2004/0198379 A1 | 10/2004 | Magee et al. | | 2006/0202819 A1 | 9/2006 | Adamczyk et al. |
| 2004/0198397 A1 | 10/2004 | Weiss | | 2006/0211453 A1 | 9/2006 | Schick |
| 2004/0203569 A1 | 10/2004 | Jijina et al. | | 2006/0218209 A1 | 9/2006 | Arrouye et al. |
| 2004/0203746 A1 | 10/2004 | Knauerhase et al. | | 2006/0227047 A1 | 10/2006 | Rosenberg |
| 2004/0203836 A1 | 10/2004 | Gorday et al. | | 2006/0229802 A1 | 10/2006 | Vertelney et al. |
| 2004/0203880 A1 | 10/2004 | Riley | | 2006/0247855 A1 | 11/2006 | de Silva et al. |
| 2004/0203909 A1 | 10/2004 | Koster | | 2006/0270421 A1 | 11/2006 | Phillips et al. |
| 2004/0215707 A1 | 10/2004 | Fujita et al. | | 2006/0271280 A1 | 11/2006 | O'Clair |
| 2004/0228330 A1 | 11/2004 | Kubler et al. | | 2006/0284767 A1 | 12/2006 | Taylor |
| 2004/0236504 A1 | 11/2004 | Bickford et al. | | 2006/0287824 A1 | 12/2006 | Lin |
| 2004/0242149 A1 | 12/2004 | Luneau | | 2006/0291639 A1 | 12/2006 | Radziewicz et al. |
| 2004/0246940 A1 | 12/2004 | Kubler et al. | | 2006/0293083 A1 | 12/2006 | Bowen |
| 2004/0248586 A1 | 12/2004 | Patel et al. | | 2007/0001875 A1 | 1/2007 | Taylor |
| 2004/0260939 A1 | 12/2004 | Ichikawa et al. | | 2007/0003040 A1 | 1/2007 | Radziewicz et al. |
| 2004/0263084 A1 | 12/2004 | Mor et al. | | 2007/0005188 A1 | 1/2007 | Johnson |
| 2004/0264442 A1 | 12/2004 | Kubler et al. | | 2007/0005233 A1 | 1/2007 | Pinkus et al. |
| 2005/0002419 A1 | 1/2005 | Doviak et al. | | 2007/0006098 A1 | 1/2007 | Krumm et al. |
| 2005/0004838 A1 | 1/2005 | Perkowski et al. | | 2007/0008515 A1 | 1/2007 | Otani et al. |
| 2005/0009511 A1 | 1/2005 | Bostrom et al. | | 2007/0010942 A1 | 1/2007 | Bill |
| 2005/0027442 A1 | 2/2005 | Kelley et al. | | 2007/0016362 A1 | 1/2007 | Nelson |
| 2005/0033515 A1* | 2/2005 | Bozzone ............. 701/214 | | 2007/0027614 A1 | 2/2007 | Reeser et al. |
| 2005/0037781 A1 | 2/2005 | Ozugur et al. | | 2007/0027628 A1 | 2/2007 | Geelen |
| 2005/0039140 A1 | 2/2005 | Chen | | 2007/0038364 A1* | 2/2007 | Lee et al. ............. 701/200 |
| 2005/0046584 A1 | 3/2005 | Breed | | 2007/0042790 A1 | 2/2007 | Mohi et al. |
| 2005/0071078 A1 | 3/2005 | Yamada et al. | | 2007/0055684 A1 | 3/2007 | Steven |
| 2005/0071702 A1 | 3/2005 | Morisawa | | 2007/0061245 A1 | 3/2007 | Ramer et al. |
| 2005/0075116 A1 | 4/2005 | Laird | | 2007/0061301 A1 | 3/2007 | Ramer et al. |
| 2005/0085272 A1 | 4/2005 | Anderson et al. | | 2007/0061363 A1 | 3/2007 | Ramer et al. |
| 2005/0091408 A1 | 4/2005 | Parupudi et al. | | 2007/0071114 A1 | 3/2007 | Sanderford et al. |
| 2005/0096840 A1 | 5/2005 | Simske | | 2007/0073480 A1 | 3/2007 | Singh |
| 2005/0114021 A1 | 5/2005 | Krull et al. | | 2007/0073719 A1 | 3/2007 | Ramer et al. |
| 2005/0130677 A1 | 6/2005 | Meunier et al. | | 2007/0093258 A1 | 4/2007 | Steenstra et al. |
| 2005/0134440 A1 | 6/2005 | Breed | | 2007/0106465 A1 | 5/2007 | Adam et al. |
| 2005/0134578 A1 | 6/2005 | Chambers et al. | | 2007/0115868 A1 | 5/2007 | Chen et al. |
| 2005/0149250 A1 | 7/2005 | Isaac | | 2007/0124043 A1 | 5/2007 | Ayoub et al. |
| 2005/0153681 A1 | 7/2005 | Hanson | | 2007/0124058 A1 | 5/2007 | Kitagawa et al. |
| 2005/0176411 A1 | 8/2005 | Taya | | 2007/0124066 A1 | 5/2007 | Kikuchi |
| 2005/0186954 A1 | 8/2005 | Kenney | | 2007/0127661 A1 | 6/2007 | Didcock |
| 2005/0197767 A1 | 9/2005 | Nortrup | | 2007/0129888 A1 | 6/2007 | Rosenberg |
| 2005/0203698 A1 | 9/2005 | Lee | | 2007/0130153 A1 | 6/2007 | Nachman et al. |
| 2005/0221799 A1 | 10/2005 | Tervo et al. | | 2007/0135136 A1 | 6/2007 | Ische |
| 2005/0221808 A1 | 10/2005 | Karlsson et al. | | 2007/0135990 A1 | 6/2007 | Seymour et al. |
| 2005/0221843 A1 | 10/2005 | Friedman et al. | | 2007/0149212 A1 | 6/2007 | Gupta et al. |

| | | | | | | |
|---|---|---|---|---|---|---|
| 2007/0150192 A1* | 6/2007 | Wakamatsu et al. ............ 701/213 | 2008/0167083 A1 | 7/2008 | Wyld et al. | |
| 2007/0150320 A1 | 6/2007 | Huang | 2008/0167796 A1 | 7/2008 | Narayanaswami | |
| 2007/0153983 A1 | 7/2007 | Bloebaum et al. | 2008/0167811 A1 | 7/2008 | Geelen | |
| 2007/0153984 A1 | 7/2007 | Bloebaum et al. | 2008/0172173 A1 | 7/2008 | Chang et al. | |
| 2007/0153986 A1 | 7/2007 | Bloebaum et al. | 2008/0172374 A1 | 7/2008 | Wolosin et al. | |
| 2007/0155360 A1 | 7/2007 | An | 2008/0176545 A1 | 7/2008 | Dicke et al. | |
| 2007/0156326 A1 | 7/2007 | Nesbitt | 2008/0177793 A1 | 7/2008 | Epstein et al. | |
| 2007/0156337 A1* | 7/2007 | Yanni ............................ 701/213 | 2008/0178116 A1 | 7/2008 | Kim | |
| 2007/0179854 A1 | 8/2007 | Ziv et al. | 2008/0186162 A1 | 8/2008 | Rajan et al. | |
| 2007/0184855 A1 | 8/2007 | Klassen | 2008/0189033 A1 | 8/2008 | Geelen et al. | |
| 2007/0191029 A1 | 8/2007 | Zarem et al. | 2008/0194273 A1* | 8/2008 | Kansal et al. ............. 455/456.3 | |
| 2007/0200713 A1 | 8/2007 | Weber et al. | 2008/0200142 A1 | 8/2008 | Abdel-Kader et al. | |
| 2007/0204218 A1 | 8/2007 | Weber et al. | 2008/0207167 A1 | 8/2008 | van Os et al. | |
| 2007/0206730 A1 | 9/2007 | Polk | 2008/0225779 A1 | 9/2008 | Bragiel et al. | |
| 2007/0208492 A1 | 9/2007 | Downs et al. | 2008/0227473 A1 | 9/2008 | Haney | |
| 2007/0208497 A1 | 9/2007 | Downs et al. | 2008/0233919 A1 | 9/2008 | Kenney | |
| 2007/0208498 A1 | 9/2007 | Barker et al. | 2008/0248815 A1 | 10/2008 | Busch | |
| 2007/0208507 A1* | 9/2007 | Gotoh ........................... 701/210 | 2008/0249667 A1 | 10/2008 | Horvitz et al. | |
| 2007/0218925 A1 | 9/2007 | Islam et al. | 2008/0268876 A1 | 10/2008 | Gelfand et al. | |
| 2007/0219706 A1 | 9/2007 | Sheynblat | 2008/0271072 A1 | 10/2008 | Rothschild et al. | |
| 2007/0229549 A1 | 10/2007 | Dicke et al. | 2008/0284642 A1 | 11/2008 | Seacat et al. | |
| 2007/0232272 A1 | 10/2007 | Gonsalves et al. | 2008/0287124 A1 | 11/2008 | Karabinis | |
| 2007/0232326 A1 | 10/2007 | Johnson | 2008/0288166 A1 | 11/2008 | Onishi | |
| 2007/0233387 A1 | 10/2007 | Johnson | 2008/0293397 A1 | 11/2008 | Gajdos et al. | |
| 2007/0238491 A1 | 10/2007 | He | 2008/0310850 A1 | 12/2008 | Pederson et al. | |
| 2007/0247435 A1 | 10/2007 | Benko et al. | 2008/0318550 A1 | 12/2008 | DeAtley | |
| 2007/0254676 A1 | 11/2007 | Pedigo et al. | 2008/0319644 A1* | 12/2008 | Zehler ......................... 701/201 | |
| 2007/0259674 A1 | 11/2007 | Neef et al. | 2008/0319652 A1 | 12/2008 | Moshfeghi | |
| 2007/0260751 A1 | 11/2007 | Meesseman | 2009/0003659 A1 | 1/2009 | Forstall et al. | |
| 2007/0266116 A1 | 11/2007 | Rensin et al. | 2009/0005005 A1 | 1/2009 | Forstall et al. | |
| 2007/0271328 A1 | 11/2007 | Geelen et al. | 2009/0005018 A1 | 1/2009 | Forstall et al. | |
| 2007/0276586 A1 | 11/2007 | Jeon et al. | 2009/0005021 A1 | 1/2009 | Forstall et al. | |
| 2007/0276587 A1 | 11/2007 | Johnson | 2009/0005068 A1 | 1/2009 | Forstall et al. | |
| 2007/0276596 A1 | 11/2007 | Solomon et al. | 2009/0005070 A1 | 1/2009 | Forstall et al. | |
| 2007/0281664 A1 | 12/2007 | Kaneko et al. | 2009/0005071 A1 | 1/2009 | Forstall et al. | |
| 2007/0282521 A1 | 12/2007 | Broughton | 2009/0005072 A1 | 1/2009 | Forstall et al. | |
| 2007/0282565 A1* | 12/2007 | Bye et al. ...................... 702/158 | 2009/0005076 A1 | 1/2009 | Forstall et al. | |
| 2007/0290920 A1 | 12/2007 | Shintai et al. | 2009/0005080 A1 | 1/2009 | Forstall et al. | |
| 2007/0299601 A1 | 12/2007 | Zhao et al. | 2009/0005082 A1 | 1/2009 | Forstall et al. | |
| 2008/0004789 A1 | 1/2008 | Horvitz et al. | 2009/0005964 A1 | 1/2009 | Forstall et al. | |
| 2008/0004791 A1 | 1/2008 | Sera | 2009/0005965 A1 | 1/2009 | Forstall et al. | |
| 2008/0004802 A1 | 1/2008 | Horvitz | 2009/0005978 A1 | 1/2009 | Forstall et al. | |
| 2008/0005104 A1 | 1/2008 | Flake et al. | 2009/0005981 A1 | 1/2009 | Forstall et al. | |
| 2008/0005301 A1 | 1/2008 | Li et al. | 2009/0006336 A1 | 1/2009 | Forstall et al. | |
| 2008/0015422 A1 | 1/2008 | Wessel | 2009/0030605 A1 | 1/2009 | Breed | |
| 2008/0021632 A1 | 1/2008 | Amano | 2009/0031006 A1 | 1/2009 | Johnson | |
| 2008/0024360 A1 | 1/2008 | Taylor | 2009/0033540 A1 | 2/2009 | Breed et al. | |
| 2008/0024364 A1 | 1/2008 | Taylor | 2009/0042585 A1 | 2/2009 | Matsuda | |
| 2008/0027636 A1 | 1/2008 | Tengler et al. | 2009/0089706 A1 | 4/2009 | Furches et al. | |
| 2008/0030308 A1 | 2/2008 | Johnson | 2009/0098857 A1 | 4/2009 | DeAtley | |
| 2008/0032703 A1 | 2/2008 | Krumm et al. | 2009/0177385 A1 | 7/2009 | Matas et al. | |
| 2008/0032721 A1 | 2/2008 | MacDonald et al. | 2009/0228961 A1 | 9/2009 | Wald et al. | |
| 2008/0045234 A1 | 2/2008 | Reed | 2009/0234743 A1 | 9/2009 | Wald et al. | |
| 2008/0046176 A1 | 2/2008 | Jurgens | 2009/0259573 A1 | 10/2009 | Cheng et al. | |
| 2008/0052407 A1 | 2/2008 | Baudino et al. | 2009/0271271 A1 | 10/2009 | Johnson | |
| 2008/0065311 A1 | 3/2008 | Bauchot et al. | 2009/0281724 A1 | 11/2009 | Blumenberg et al. | |
| 2008/0070593 A1 | 3/2008 | Altman et al. | 2009/0286549 A1 | 11/2009 | Sazegari et al. | |
| 2008/0071466 A1 | 3/2008 | Downs et al. | 2010/0082820 A1 | 4/2010 | Furukawa | |
| 2008/0082254 A1* | 4/2008 | Huhtala et al. ................ 701/201 | 2010/0106397 A1 | 4/2010 | Van Essen | |
| 2008/0085727 A1 | 4/2008 | Kratz | 2010/0131584 A1 | 5/2010 | Johnson | |
| 2008/0086240 A1 | 4/2008 | Breed | 2010/0173647 A1 | 7/2010 | Sheynblat | |
| 2008/0088486 A1 | 4/2008 | Rozum et al. | 2010/0207782 A1 | 8/2010 | Johnson | |
| 2008/0091347 A1 | 4/2008 | Tashiro | 2011/0051658 A1 | 3/2011 | Jin et al. | |
| 2008/0097698 A1 | 4/2008 | Arnold-Huyser et al. | | | | |
| 2008/0098090 A1 | 4/2008 | Geraci et al. | | FOREIGN PATENT DOCUMENTS | | |
| 2008/0104634 A1 | 5/2008 | Gajdos et al. | CA | 2163215 | 5/1994 | |
| 2008/0109153 A1 | 5/2008 | Gueziec | CA | 2287596 | 4/2000 | |
| 2008/0113672 A1 | 5/2008 | Karr et al. | CA | 2432239 | 12/2004 | |
| 2008/0129528 A1 | 6/2008 | Guthrie | DE | 3 621 456 | 1/1988 | |
| 2008/0132243 A1 | 6/2008 | Spalink et al. | DE | 4437360 | 4/1996 | |
| 2008/0132251 A1 | 6/2008 | Altman et al. | DE | 19506890 | 8/1996 | |
| 2008/0132252 A1 | 6/2008 | Altman et al. | DE | 19914257 | 3/1999 | |
| 2008/0140308 A1 | 6/2008 | Yamane et al. | DE | 10 141 695 | 3/2003 | |
| 2008/0140520 A1 | 6/2008 | Hyder et al. | EP | 0 288 068 | 7/1992 | |
| 2008/0153512 A1 | 6/2008 | Kale et al. | EP | 0 745 867 | 12/1996 | |
| 2008/0153513 A1 | 6/2008 | Flake et al. | EP | 0 763 749 | 3/1997 | |
| 2008/0155453 A1 | 6/2008 | Othmer | EP | 0 786 646 | 7/1997 | |
| 2008/0160956 A1 | 7/2008 | Jackson et al. | EP | 785535 | 7/1997 | |
| 2008/0161034 A1 | 7/2008 | Akiyama | EP | 0 809 117 | 11/1997 | |

| | | |
|---|---|---|
| EP | 0 813 072 | 12/1997 |
| EP | 0 699 330 B1 | 4/1998 |
| EP | 0 908 835 | 4/1999 |
| EP | 0 997 808 | 5/2000 |
| EP | 1 083 764 | 3/2001 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 790 947 | 5/2007 |
| EP | 1 860 904 | 11/2007 |
| EP | 1 933 249 | 8/2008 |
| FR | 2730083 | 8/1996 |
| FR | 2754093 | 4/1998 |
| FR | 2272911 | 6/1999 |
| FR | 2810183 | 12/2001 |
| GB | 2 278 196 | 11/1994 |
| GB | 2 322 248 | 8/1998 |
| GB | 2 359 888 | 5/2001 |
| GB | 2 407 230 | 4/2005 |
| JP | 2007127439 A | 5/1977 |
| JP | 62142215 | 6/1987 |
| JP | 05-071974 | 3/1993 |
| JP | 06-525189 | 5/1994 |
| JP | 2007-221433 | 5/1994 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 9-062993 | 7/1997 |
| JP | 09-200850 | 7/1997 |
| JP | 9-210710 | 8/1997 |
| JP | 9-319300 | 12/1997 |
| JP | 10-021259 | 1/1998 |
| JP | 11-234736 | 8/1999 |
| JP | 2000-163379 | 6/2000 |
| JP | 2001-160063 | 6/2001 |
| JP | 2002-310680 | 10/2002 |
| JP | 10-030933 | 2/2003 |
| JP | 2003-228532 | 8/2003 |
| JP | 2004-045054 | 2/2004 |
| JP | 2004-219146 | 7/2004 |
| JP | 2004-362271 | 12/2004 |
| JP | 2005-106741 | 4/2005 |
| JP | 2005-182146 | 7/2005 |
| JP | 2005-241519 | 9/2005 |
| JP | 2006-112338 | 4/2006 |
| JP | 2006-184007 | 7/2006 |
| JP | 2006-270889 | 10/2006 |
| JP | 2006-279838 | 10/2006 |
| JP | 2007-033220 | 2/2007 |
| JP | 2007-033331 | 2/2007 |
| JP | 2007033368 A | 2/2007 |
| JP | 2007-127439 | 5/2007 |
| JP | 2007127439 | 5/2007 |
| JP | 2007-147439 | 6/2007 |
| JP | 2007-201699 | 8/2007 |
| JP | 2007-240400 | 9/2007 |
| JP | 2007-259291 | 10/2007 |
| JP | 2007-271299 | 10/2007 |
| JP | 2007-304009 | 11/2007 |
| JP | 2008-058917 | 3/2008 |
| JP | 2008-129774 | 6/2008 |
| KR | 2004-102440 | 12/2004 |
| KR | 2005-096746 | 10/2005 |
| TW | 200426387 | 12/2004 |
| WO | WO 93/20546 | 10/1993 |
| WO | WO 94/08250 | 4/1994 |
| WO | WO 97/07467 | 2/1997 |
| WO | WO9724577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |
| WO | WO 02/054813 | 7/2002 |
| WO | WO 03/023593 | 3/2003 |
| WO | WO 03/096055 | 11/2003 |
| WO | WO 2004/008792 | 1/2004 |
| WO | WO 2004/021730 | 3/2004 |
| WO | WO 2004/061576 | 7/2004 |
| WO | WO 2004/076977 | 9/2004 |
| WO | WO 2005/006258 | 1/2005 |
| WO | WO 2005/084052 | 9/2005 |
| WO | WO 2006/065856 | 6/2006 |
| WO | WO 2006/113125 | 10/2006 |
| WO | WO 2007/027065 | 3/2007 |
| WO | WO 2007/052285 | 5/2007 |
| WO | WO 2008/051929 | 5/2008 |
| WO | WO 2008/085740 | 7/2008 |
| WO | WO 2009/140031 | 11/2009 |

OTHER PUBLICATIONS

"New program for mobile blogging for Pocket PC released: My Blog," [online] [Retrieved on Apr. 5, 2006]; Retrieved from the Internet URL: http://msmobiles.com/news.php/4067.html; 1 page.
"Numbering and Dialing Plan Within the United States," *Alliance for Telecommunications Industry Solutions*, 2005, 17 pages.
Feddema et al., "Cooperative Sentry Vehicles and Differential GPS Leapfrog," 2000, *United States Department of Energy*, pp. 1-12.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
Yang and Marsland, "Global Snapshots for Distributed Debugging," *IEEE*, 1992, pp. 436-440.
Yogesh C. Rathod, Third Party Submission in U.S. Appl. No. 12/233,358 mailed Mar. 30, 2010, 12 pages.
U.S. Appl. No. 11/464,671, filed Aug. 15, 2006, Johnson.
U.S. Appl. No. 11/827,065, filed Jul. 10, 2007, Johnson.
U.S. Appl. No. 11/972,559, filed Jan. 10, 2008, Alten.
U.S. Appl. No. 12/044,363, filed Mar. 7, 2008, Johnson.
U.S. Appl. No. 11/114,714, filed May 2, 2008, Williamson et al.
U.S. Appl. No. 12/119,316, filed May 12, 2008, Blumenberg et al.
U.S. Appl. No. 12/122,339, filed May 16, 2008, Sazegari et al.
U.S. Appl. No. 12/233,358, filed Sep. 18, 2008, Low et al.
U.S. Appl. No. 12/270,814, filed Nov. 13, 2008, Herz.
"27 Countries in your pocket"; [online] [Retrieved on Sep. 29, 2005] Retrieved from the Internet <URL: http://www.mio-tech.be/en/printview/press-releases-2005-09-29.htm; 1 page.
"Animated Transition"; [online] [Retrieved on Oct. 16, 2006] Retrieved from the Internet <URL: http://designinterfaces.com/Animated_Transition; 2 pages.
"DaimlerCrysler Guide5 Usecases Overview Map", 1 page (no reference date).
"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.
"Mio 269+ Users Manula"; 2005; 44 pages.
Review Guide—Google Maps for mobile (beta); Google; 2006; 7 pages.
"User-centered design of mobile solutions", NAMAHN, 2006, 18 pages.
"User's Manual MioMap 2.0"; Aug. 2005; 60 pages.
"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.
"Windows Mobile 6 Professional Video Tour"; [online] [Retrieved on Mar. 11, 2007]; Retrieved from the Internet, URL: http://gizmodo.com/gadgets/cellphones/windows-mobile-6-professional-video-tour-237039.php; 4 pages.
"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.
Beard et al., "Estimating Positions and Paths of Moving Objects", IEEE 2000, pp. 1-8.
Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.
Binzhuo et al., "Mobile Phone GIS Based on Mobile SVG", IEEE 2005.
Bokharouss et al., "A Location-Aware Mobile Call Handling Assistant", International Conference on Advanced Information Networking and Applications Workshops, 2007.
Boonsrimuang et al., "Mobile Internet Navigation System", IEEE, 2002, pp. 325-328.
Camp et al., "A computer-based method for predicting transit time systems", Decsision Sciences, vol. 5, pp. 339-346, 1974.
Carew; "Phones that tell you where to drive, meet, eat"; [online] [Retrieved May 26, 2007]; Retrieved from the Internet <URL htlp://news.yahoo.com/s/nm/20070525/wr_nm/column_pluggedin_dc_2&printer=1;_ylt=Ahqaftn7xm1S2r0FZFeu9G4ht.cA; 2 pages.
Cho et al., A Traveler Information Service Structure in Hybrid T-DMB and Cellular Communication Network, Broadcast Systems Research Group, IEEE, 2006, pp. 747-750.
Christie et al., "Development and Deployment of GPS wireless devices for E911 and Location based services", IEEE 2002.
Chua et al., "Intelligent Portal for Event-triggered SMS Alerts", 2nd International Conference on Mobile Technology, Applications and Systems, 2005.
Civilis et al., "Efficient Tracking of Moving Objects with Precision Guarantees", IEEE, Proceedings of the First Annual International Conference on Mobile and Ubiquitous Systems: Networking and Services, 2004, 10 pages.
Dibdin, Peter, "Where are mobile location based services?", Dec. 14, 2001, pp. 1-8.
Dunn et al., "Wireless Emergency Call System", IBM TDB, Sep. 1994.
Ebine, "Dual Frequency resonant base station antennas for PDC systems in Japan", IEEE, pp. 564-567, 1999.
Evans, "In-Vehicle Man-Machine Interaction the Socrates Approach", Vehicle Navigation & Information System Conference Proceedings, 1994, Aug. 31-Sep. 2, 1994, pp. 473-477.
FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.d11/fm/3-25.26/toc.htm] Jul. 20, 2001, pp. 1-7 and J-1 to J-3.
*GPS 12 Personal Navigator Owner's Manual & Reference*, Garmin Corporation, Jan. 1999, pp. 1-60.
Guo et al., "An Intelligent Query System based on Chinese Short Message Service for Restaurant Recommendation", IEEE 2007, 1 page.
Hameed et al., "An Intelligent Agent-Based Medication and Emergency System", IEEE 2006.
Helal et al., "Drishti: An Integrated Navigation System for Visually Impaired and Disabled", Fifth International Symposium on Wearable Computers (ISWC'01), IEEE, 2001, pp. 149-156.
Hohman et al., "GPS Roadside Integrated Precision Positioning System", Position Location and Navigation Symposium (IEEE 2000), pp. 221-230.
International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.
Ju et al., "RFID Data Collection and Integration based on Mobile Agent", IEEE, 2006.
Kbar et al., "Mobile Station Location based on Hybrid of Signal Strength and Time of Arrival", IEEE, 2005.
Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.
Manabe et al., "On the M-CubITS Pedestrian Navigation System", IEEE, 2006, pp. 793-798.
Meier et al., "Location-Aware Event-Base Middleware: A Paradigm for Collaborative Mobile Applications?", Sep. 2003.
Miller et al., "Synchronization of Mobile XML Databases by Utilizing Deferred Views", IEEE 2004.
Nardi et al., "Integrating Communication and Information through Contact Map", Communications of the ACM, vol. 45, No. 4, Apr. 2002.
Northard, "Docking Station Communication Link", IBM TDB, Feb. 1994.
Oh et al., "Spatial Applications Using 4S Technology for Mobile Environment", IEEE 2002.
Paksoy et al., "The Global Position System-Navigation Tool of the Future", Journal of Electrical & Electronics, 2002, vol. 2, No. 1, pp. 467-476.
Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.
Partial International Search Report, dated Jul. 29, 2008, issued in corresponding PCT/US2008/050295.
Pfoser et al., "Dynamic Travel Time Maps—Enabling Efficient Navigation", Proceedings of the 18th International Conference on Scientific and Statistical Database Management (SSDBM'06), IEEE, 10 pages.
Portfolio 2007; [online] [Retrieved on Jun. 14, 2007]; Retrieved from the Internet, URL: http://eric.wahlforss.com/folio; 3 pages.
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto, J., *Augment-able Reality: Situated Communication through Physical and Digital Spaces*, iswc, pp. 68, Second International Symposium on Wearable computers (ISWC'98), 1998, pp. 1-8.
Rogers et al., "Adaptive User Interfaces for Automotive Environments", IEEE Intelligent Vehicles Symposium 2000, Oct. 3-5, 2000, pp. 662-667.
Rozier, J., *Hear & There: An Augmented Reality System of Linked Audio*, Proceedings of the International Conference on Auditory Display, Atlanta, GA, Apr. 2000, pp. 1-6.
Samadani et al., "PathMaker: Systems for Capturing Trips", IEEE (2004) International Conference on Multimedia and Expo., Publication Date: Jun. 27-30, 2004, vol. 3, pp. 2123-2126, 2004.
Schreiner, "Where We At? Mobile Phones Bring GPS to the Masses", IEEE Computers Society, May/Jun. 2007, pp. 6-11.
Sung et al., "Towards Reliable Peer-to-Peer Data Sharing over Mobile Ad hoc Networks", IEEE, 2005.
Weib et al., "Zone services—An approach for location-based data collection", Proceedings of the 8th International Conference on E-commerce Technology and the 3rd IEEE International Conference on Enterprise Computing, E-Commerce and E-Services.
Yang et al., "A Mutlimedia System for Route Sharing and Video-based Navigation", IEEE, 2006, pp. 73-76.
Yanyan et al., "The model of optimum route selection in vehicle automatic navigation system based on unblocked reliability analyses", IEEE 2003.
Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.
Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.
Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

International Search Report and Written Opinion, dated Jun. 9, 2008, issued in International Application No. PCT/US2007/088880, filed Dec. 27, 2007.
Spohrer. "New Paradigms for Using Computers", 1997; retrieved from the Internet, URL: <http://almaden.ibm.com/npuc97/1997/spohrer.htm>.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharpe et al., U.S. Appl. No. 12/434,586, filed May 1, 2009.
Sharp et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Berman et al., "The Role of Dead Reckoning and Inertial Sensors in Future General Aviation Navigation", IEEE (1998), pp. 510-517.
Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15 No. 2 (Mar. 2007), pp. 199-208.
Jirawimut et al., "A Method for Dead Reckoning Parameter Correction in Pedestrian Navigation System", IEEE Transactions on Instrumentation and Measurement, vol. 52 No. 1, (Feb. 2003), pp. 209-215.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
US 6,731,928, 05/2004, Tanaka (withdrawn).
Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
Challe, "Carminat—An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.

Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPS: making roads safer and solving traffic tangles," Asia Engineer, 1995, 23(9):31-32.
Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Benefon ESC! GSM+GPS Personal Navigation Phone, benefon.com, Copyright 2001, 4 pages.
Freundschuh, "Does 'Anybody' Really Want (Or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.
Bonsignore, "A Comparative Evaluation of the Benefits of Advanced Traveler Information System (ATIS) Operational Tests," MIT Masters Thesis, Feb. 1994, 140 pages.
Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.
Burnett, "Usable Vehicle Navigation Systems: Are We There Yet?" Vehicle Electronic Systems 2000, Jun. 29-30, 2000, 3.1.1-3.1.12.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.
Mahmassani et al., "Providing Advanced and Real-Time Travel/Traffic Information to Tourists," Center for Transportation Research, Bureau of Engineering Research, The University of Texas at Austin, Oct. 1998, 15 pages.
"New Handsets Strut Their Stuff At Wireless '99," Internet: URL: http://findarticles.com/p/articles/mi_m0BMD/is_1999_Feb_11/ai_n27547656/ downloaded from Internet on Feb. 11, 1999, 3 pages.
"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.
Green et al., "Suggested Human Factors Design Guidelines for Driver Information Systems," Technical Report UMTRI-93-21, Nov. 1993, 119 pages.
Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.

Muraskin, "Two-Minute Warnings for School Bus Riders," Internet: URL: http://www.callcentermagazine.com/shared/printableArticle.jhtml;jsessionid=PQH1SZXW . . . Jul. 1, 1999, 3 pages.

Ni and Deakin, "On-Board Advanced Traveler Information Systems," Dec. 1, 2002, 10 pages.

Serafin et al., "Functions and Features of Future Driver Information Systems," Technical Report UMTRI-91-16, May 1991, 104 pages.

Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

"LaBarge in joint venture on bus system," Internet: URL: http://www.bizjournals.com/stlouis/stories/1998/08/10/focus2.html?t-printable, Aug. 7, 1998, 1 page.

Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.

Zubac and Strahonja, "Theory and Development of an Online Navigation System," 18th International Conference on Information and Intelligent Systems, University of Zagreb, Sep. 12-14, 2007.

Brown, "The stick-e document: a framework for creating context-aware applications," Electronic Publishing, 1995, 8:259-272.

Brown, "Triggering Information by Context," Personal Technologies, 1998, 2:18-27.

Dey et al., "CyberDesk: a framework for providing self-integrating context-aware services," Knowledge-Based Systems, 1998, 11:3-13.

Hodes and Katz, "Composable ad hoc location-based services for heterogeneous mobile clients," Wireless Networks, 1999, 5:411-427.

Kreller et al., "A Mobile-Aware City Guide Application," ACTS Mobile Communication Summit, 1998, Rhodes, Greece, 7 pages.

Lusky et al., "Mapping the Present," ColoradoBiz, Nov. 1999, 26(11):16-17.

McCarthy and Meidel, "Activemap: A Visualization Tool for Location Awareness to Support Informal Interactions," HUC '99, LNCS 1707, 1999, pp. 158-170.

O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.

Pascoe et al., "Developing Personal Technology for the Field," Personal Technologies, 1998, 2:28-36.

Tarumi et al., "Public Applications of SpaceTag and Their Impacts," Digital Cities, LNCS 1765, 2000, pp. 350-363.

Tebbutt, "Dial your way out of the woods," The Australian, Feb. 2000, 1 page.

Tso et al., "Always on, Always Connected Mobile Computing," Mobile Communications Operation—Mobile Handheld Products Group, 1996, pp. 918-924.

Wang and Lin, "Location Aware Information Agent over WAP," Tamkang Journal of Science and Engineering, 2000, 3(2):107-115.

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

"Report on Location Service feature (LCS) 25.923 v1.0.0," TSG-RAN Working Group 2 (Radio layer 2 and Radio layer 3), Berlin, May 25-28, 1999, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"Enabling UMTS / Third Generation Services and Applications," No. 11 Report from the UMTS Forum, Oct. 2000, 72 pages.

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"Revised CR to 09/31 on work item LCS," ETSI SMG3 Plenary Meeting #6, Nice, France, Dec. 13-15, 1999. 18 pages.

Digital cellular telecommunications system (Phase 2+); Location Services (LCS); Service description, Stage 1 (GSM 02.71) ETSI, Apr. 1999, 22 pages.

Akerblom, "Tracking Mobile Phones in Urban Areas," Goteborg University Thesis, Sep. 2000, 67 pages.

Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.

Balsiger et al., "MOGID: Mobile Geo-depended Information on Demand," Workshop on Position Dependent Information Services (W3C-WAP), 2000, 8 pages.

Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.

Cheverst et al., "The Role of Connectivity in Supporting Context-Sensitive Applications," HUC'99, LNCS 1707, 1999, pp. 193-209.

Efstratiou and Cheverst, "Reflection: A Solution for Highly Adaptive Mobile Systems," 2000 Workshop on Reflective Middleware, 2000, 2 pages.

Cheverst et al., "The Support of Mobile-Awareness in Collaborative Groupware," Personal Technologies, 1999, 3:33-42.

Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.

Cheverst et al., "Experiences of Developing and Deploying a Context-Aware Tourist Guide: The Guide Project," 2000, pp. 20-31.

Cheverst et al., "Exploiting Context to Support Social Awareness and Social Navigation," SIGGROUP Bulleting Dec. 2000, 21(3):43-48.

Cheverst et al., "Services to Support Consistency in Mobile Collaborative Applications," Proc. 3rd International Workshop on Services in Distributed Networked Environments, 1996, 8 pages.

Cheverst et al., "Sharing (Location) Context to Facilitate Collaboration Between City Visitors," 2000, 8 pages.

Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems platform for mobile computing," Mobile Networks and Applications, 1998, 3:143-156.

Davies et al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network-based location services," Ericsson Press Release, Oct. 11, 1999, 2 pages.

Fischer et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday et al., "Developing Adaptive Applications: The MOST Experience," J. Integrated Computer-Aided Engineering, 1999, pp. 143-157.

Gunnarsson et al., "Location Trial System for Mobile Phones," IEEE, 1998, pp. 2211-2216.

Jose and Davies, "Scalable and Flexible Location-Based Services for Ubiquitous Information Access," HUC'99, LNCS 1707, 1999, pp. 52-66.

Klinec and Nolz, "Nexus-Positioning and Communication Environment for Spatially Aware Applications," IAPRS, Amsterdam, 2000, 7 pages.

Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.

Kreller et al., "UMTS: A Middleware Architecture and Mobile API/Approach," IEEE Personal Communications, Apr. 1998, pp. 32-38.

Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.

Kyriazakos et al., "Optimization of the Handover Algorithm based on the Position of the Mobile Terminals," Communications and Vehicular Technology, Oct. 2000, pp. 155-159.

Leonhardt and Magee, "Multi-Sensor Location Tracking," MOBICOM 98, Dallas, TX, pp. 203-214.

Leonhardt and Magee, "Towards a general location service for mobile environments," Proc. Third International Workshop on Services in Distributed and Networked Environments, Jun. 3-4, 1996, 8 pages.

Long et al., "Rapid Prototyping of Mobile Context-Aware Applications: The Cyberguide Case Study," MobiCom '96, 1996, 11 pages.

Yokote, "The Apertos Reflective Operating System: The Concept and Its Implementation," OOPSLA'92, pp. 414-434.

Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.

Zhao, "Mobile Phone Location Determination and Its Impact on Intelligent Transportation Systems," IEEE Transactions on Intelligent Transportation Systems, Mar. 2000, 1(1):55-64.

Microsoft Outlook 2003 User's Guide, http://opan.admin.ufl.edu/user_guides/outlook2003.htm. Aug. 2004, 17 pages.

"Error: could not find a contact with this e-mail address." Outlookbanter.com. Dec. 2006, 12 pages.

* cited by examiner

ADAPTIVE MOBILE DEVICE NAVIGATION

RELATED APPLICATION

This application claims a benefit of priority from U.S. Provisional Patent Application No. 60/946,817, which provisional application is incorporated by reference herein in its entirety.

TECHNICAL FIELD

The present invention relates generally to mobile device aided navigation.

BACKGROUND

The role of traditional printed maps is being supplanted by modern devices capable of rendering dynamic map displays. Devices that include mapping or navigation applications provide information regarding an area selected by a user by recalling map data from local memory or networked services.

Mapping devices often include the ability to provide directions from a point of origin to a destination. When coupled with any of a number of positioning technologies, a mapping device can display a current position on a map as well as deliver navigation instructions based on the current position to route a user to a desired destination. Positioning technologies include satellite positioning systems such as GPS, information from nearby cellular base stations, and information from other transmitters such as, such as Wi-Fi networks.

Not all mobile mapping devices include the necessary hardware and software to receive positioning information. In addition, due to interfering factors of the environment in which a mobile device is being operated, the mobile device may not be able to receive positioning information even if it is equipped to do so.

SUMMARY

Disclosed herein are systems and methods for adaptive mobile device navigation. In one implementation, a device position is stored in memory. Sensor data is received from a motion sensor measuring movement of the device. The sensor data is compared to map data corresponding to the device location. An estimated current device location is determined. The determination is based at least in part on the device position, received sensor data, and an interpretation of the received sensor data as corresponding to movement along at least one pathway defined by the map data.

In an implementation, the pathway can be a sidewalk or a street. The motion sensor can be one or a combination of an accelerometer, a compass, and/or a gyroscope.

In an implementation, a device position is stored in memory. Sensor data is received from at least one motion sensor measuring movement of the device. An estimated current device location is determined. The determination is based at least in part on the device location and the received sensor data. The sensor data is compared to map data corresponding to the stored location. Feedback is requested regarding the comparison. In an implementation, a second device position established by a response to the feedback is stored in memory.

In an implementation the prompt includes a photograph. The photograph can be identified from a database of photographs, where the photograph includes geographical tagging information corresponding to a location that is within a threshold distance of the estimated current device location.

In an implementation, a mobile device location is determined. Sensor data is received that is related to movement of the mobile device. An estimated mobile device location is determined based on the device location and the sensor data. The estimated device location is compared to map data, and the estimated device location is verified based on the comparison.

Instructions for performing the aforementioned methods may be included in a computer program product configured for execution by one or more processors.

BRIEF DESCRIPTION OF THE DRAWINGS

Like reference numerals refer to corresponding parts throughout the drawings.

DETAILED DESCRIPTION

Figure 1:
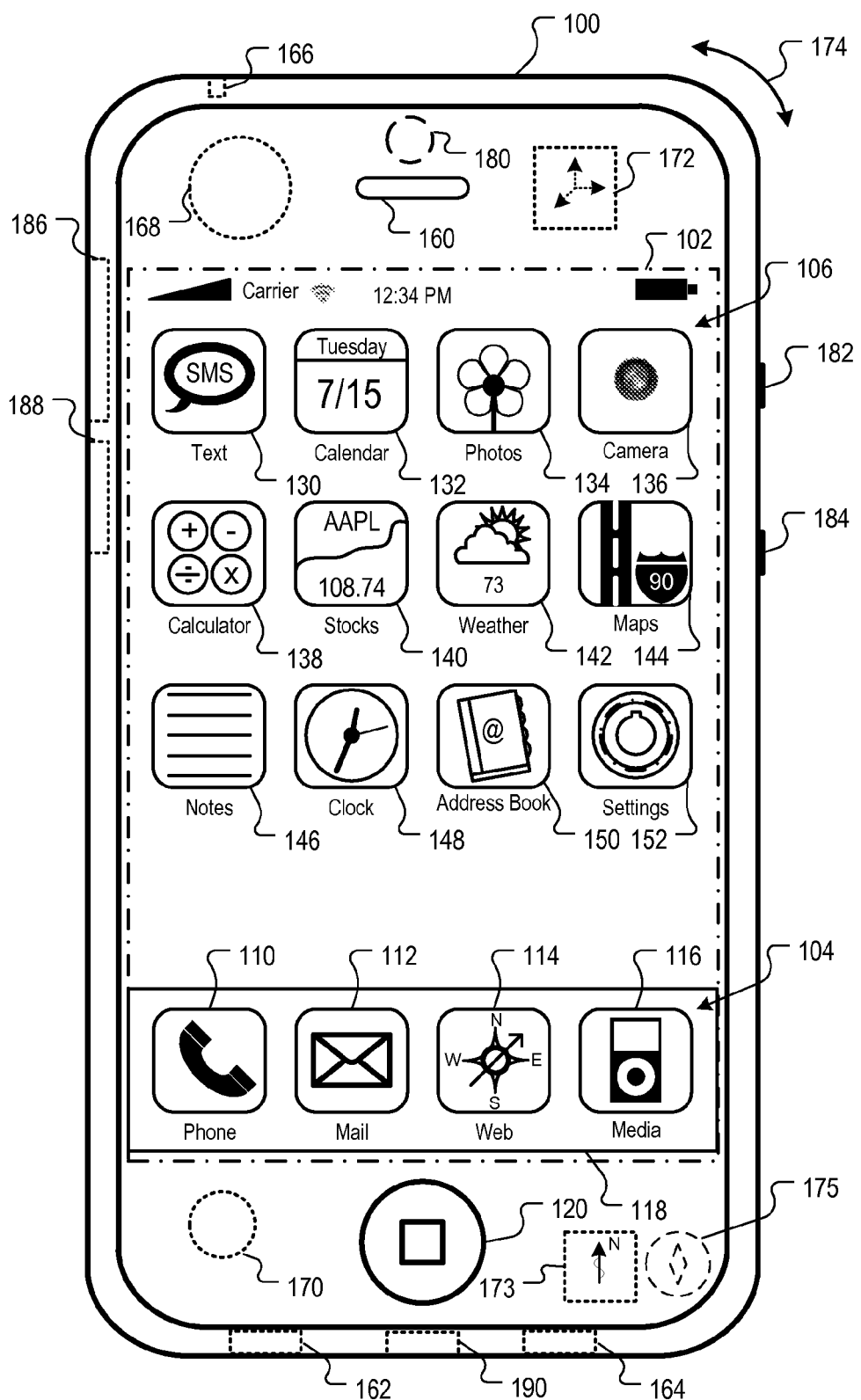
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, one or more of an accelerometer 172, a compass 173, and a gyroscope 175 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
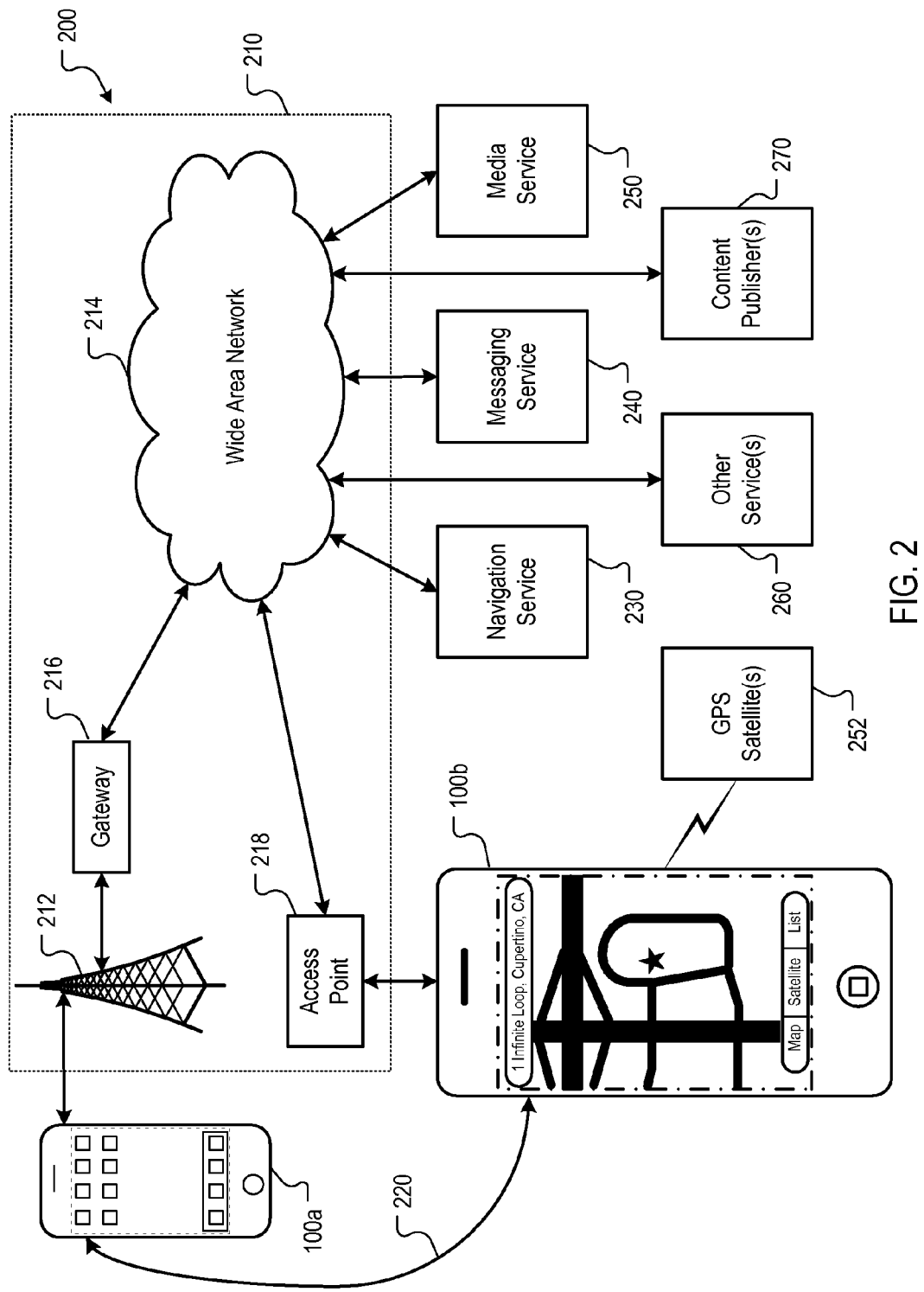
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

The mobile device 100 can also communicate with one or more GPS Satellite(s) 252 to enable circuitry and sensors (e.g., a GPS receiver on the mobile device 100) to support a location determining capability.

Exemplary Mobile Device Architecture

Figure 3:
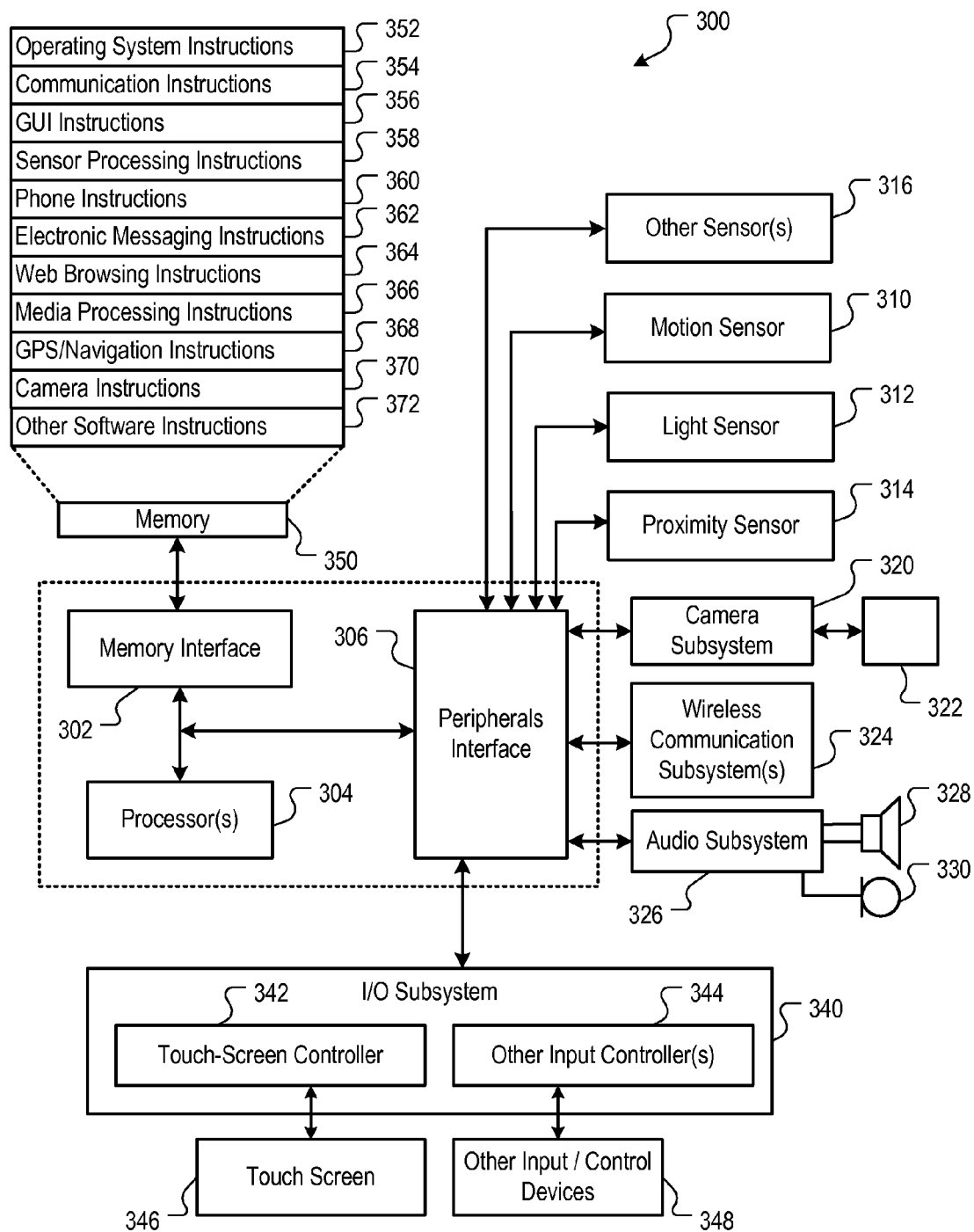
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

In an implementation, the mobile device 100 includes an integrated GPS receiver. Alternatively, or in addition, the mobile device 100 can accept a GPS receiver as an accessory. Communication with an accessory GPS receiver can occur via a wired connection such as a USB connection, a secure digital interface, or other wired connection types. Communication can also occur via a wireless connection such as IEEE 802.x, Bluetooth™, or other wireless communication formats. The location of the mobile device can be measured using information received from orbiting GPS satellites using the GPS receiver. The present latitude and longitude of the mobile device can be determined and shown on the display 102 with a map of the surrounding area. For example, selection of the map object 144 can present a user with a map showing the user's current location and a menu of options for manipulating the map using navigation features of the device 100. Other positioning systems (e.g., systems using Wi-Fi access points, television signals, cellular grids, etc.) can also be used.

In an implementation, past locations of the device 100 are stored in memory 350 so that a location history or a traveled path can be displayed. These past routes can be bookmarked or otherwise categorized for easy recall by the user.

As described above, environmental factors can prevent the location of the device being determined. For example, GPS reception is often not possible unless a line of sight can be established between the GPS receiver and the number of satellites needed to compute the receiver's location. Likewise, other location systems can also experience reception degradation, e.g., radio frequency interference or multiple time delayed versions of a transmission received due to reflections off of surrounding structures.

In an implementation, the device 100 includes one or more of an accelerometer 172, a magnetic compass 173, and/or a gyroscope 175. The accelerometer 172, compass 173, and/or gyroscope 175 can be used alone or in combination to measure movements of the device 100. Additional sensors can be located external to the device 100 on the person of the user. For example, any, some, or all of an accelerometer, a compass, a gyroscope, and an impact sensor can be located on or in the user's footwear. An impact sensor detects footwear contact with the ground, facilitating the measurement of a number of steps. A distance traveled can be estimated using the product of the average length of a user's stride and a number of steps taken. Alternatively contact with the ground during walking can be measured using an accelerometer that detects the change in velocity of a shoe as it contacts the ground. The sensors can be located on or in one or both of the user's shoes. The external sensors can send information to the device 100 via a wireless link. The length of the user's stride can be set and stored in device memory.

Sensor data from accelerometers, a compass, gyroscopes, and impact sensors can be used alone or in combination to, for example, measure the movement of the device 100 from a point of origin or known location (a "fix") to determine the device's location relative to the fix. Location measurement techniques of this type are generally referred to as "dead reckoning." Dead reckoning can be used in conjunction with other location measurement techniques such as GPS or user input, and used in cases where no satellite or terrestrial positioning signal information is available (whether the unavailability is due to interference in the operating environment or the lack or reception capabilities in the device). In an implementation, the device 100 is configured to switch into a dead reckoning positioning mode upon another positioning mode becoming unavailable.

Dead reckoning position measurement is error prone, and small errors in measuring a turn, for example, can lead to large errors later if a new fix is not obtained before a lengthy distance is traversed. Frequently updated fixes improve the accuracy of a location shown, for example, on a moving map display of the mobile device 100 measured using dead reckoning.

Figure 4:
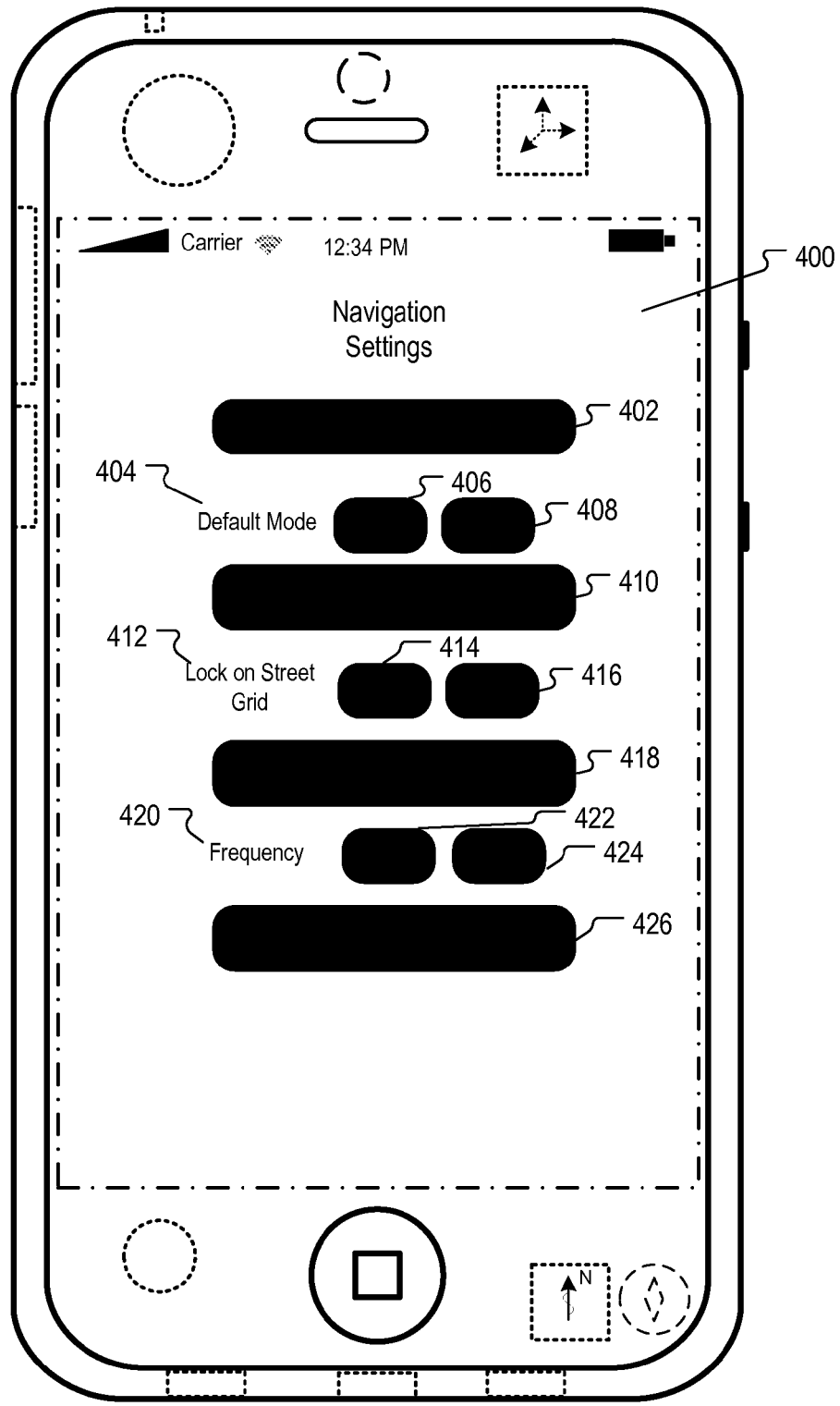
FIG. 4 is a block diagram of an example navigation settings screen of the mobile device of FIG. 1.

FIG. 4 is a block diagram of an example navigation settings screen 400 of the mobile device of FIG. 1. A user selectable touch-sensitive display button 402 to toggle dead reckoning functions on or off is shown in an enabled state. Touching the button toggles to a disabled state and changes its appearance to a lighter or "grayed out" appearance. A default mode selection 404 is shown. The "vehicle mode" button 408 is shown in an enabled state to indicate that when dead reckoning functions are active the default dead reckoning mode is the vehicle mode. The "walking mode" button 406 for this selection is showed in a disabled state. A touch of the "walking mode" button 406 in the state shown would cause a walking mode to become enabled, which, in turn, causes the "vehicle mode" button 408 to toggle to the disabled representation.

The "automatically switch to walking mode upon step detection" button 410 is shown as enabled. In an implementation, enabling this feature causes the mobile device 100 to switch to a walking mode of dead reckoning position measurement upon an accelerometer in the mobile device 100 or in communication with the mobile device 100, e.g., a footwear impact sensor, detecting walking motions such as, for example, periodic accelerations indicative of steps being taken by a user.

The "lock on street" feature 412 is shown as enabled for both a walking mode 414 and a vehicle mode 416. In an implementation, a dead reckoning mode of operation in the lock on street setting interprets data from any of the accelerometer 172, compass 173, and gyroscope 175 such that the measured movements of the device are presumed to be directed along streets of a map of the surrounding area.

The lock on street mode can, for example, be utilized to provide implicit fixes and resolve errors by adjusting a currently estimated position based on a comparison to map data. For example, the mobile device 100, by use of the accelerometer 172, compass 173, user input and/or gyroscope 175, may have a currently estimated location of a mobile device as 25 feet north of an intersection. If, however, the user of the mobile device is actually at the intersection, and turns west at the intersection and walks west in excess of a threshold distance, e.g., 10 feet, then the mobile device 100 may adjust the current estimated location to the position on the map that corresponds to 10 feet west of the intersection.

The lock on street mode can, for example, apply the implicit fixes in a bounded area, e.g., the implicit fix may not be applied if a user is walking in an open area, such as a park, in which there are no boundaries, e.g., building walls, to impede the user's path. A more detailed explanation of the lock on street mode is shown and described with respect to FIG. 5.

The "request user feedback" button 418 is shown in an enabled state, indicating the mobile device is in a user feedback fix mode. The frequency setting 420 for the user feedback fix mode is set to 10 minutes. Touches of the "amount" button 422 can cycle through a range of options, for example, 1, 2, 5, 10, 15, and 20. The "units" button 424 can cycle through a range of options, for example, minutes, feet, meters, kilometers, and miles. The "provide contextual photos" mode button 426 is shown as enabled. When in the user feedback mode, the mobile device 100 can receive periodic user feedback to adjust an estimated current location. For example, in the mode setting shown in FIG. 4, a user may be prompted to verify a current position every 10 minutes. To assist the user in verifying the current positions, a contextual photo, e.g., a photograph of a nearby landmark, can be provided. In some implementations, the user can manually enter his or her current location (e.g., latitude and longitude) and/or respond to prompts, as described in reference to FIG. 7.

In an implementation, a vehicle dead reckoning mode uses an accelerometer reading to determine how the device is positioned relative to the earth's gravity. That is, the accelerometer is used to detect which direction is down relative to the positioning of the device. This axis changes and measurements are updated if the device is reoriented in the vehicle. In the vehicle mode, sudden accelerations in a positive or negative direction along the axis of the earth's gravity are given a reduced importance in the dead reckoning position measurement calculation being utilized. Accelerations along this axis are discounted as they are likely caused by undulations of a traveling surface and reactions thereto by a vehicle suspension system. Accelerations along the axes perpendicular to the detected gravity axis are given enhanced weight in the vehicle mode as it is primarily these accelerations that contribute to displacement of the vehicle from a known fix to a second position to be measured via dead reckoning and displayed on a map. In an implementation, accelerations along the axes perpendicular to the axis of gravity are compared with rotations detected by the gyroscope 175 to determine a change of direction. In an implementation, accelerations along the axes perpendicular to the axis of gravity are compared with rotations detected by the magnetic compass 173 to determine a change of direction.

In an implementation, a walking dead reckoning mode of position measurement detects an axis of periodic sudden accelerations using the accelerometer 172 and counts the periodic accelerations as steps of the user. This axis changes and measurements are updated if the device is reoriented by a user while walking. In an implementation, the device is configured to switch to a walking mode of dead reckoning position measurement upon the detection of periodic accelerations. In an implementation, steps are counted by contact indications detected by impact sensors of footwear of the user. If only one shoe has an impact sensor, the number of impacts can be doubled to arrive at a step count. A pedometer function can calculate the product of the user's average stride and the step count to determine a distance traversed. Accelerations in axes perpendicular to the axis of periodic acceleration are measured to determine changes in direction. In an implementation, accelerations in axes perpendicular to the axis of periodic acceleration are compared with rotations detected by the gyroscope 175 to determine a change of direction. In an implementation, accelerations in axes perpendicular to the axis of periodic acceleration are compared with rotations detected by the magnetic compass 173 to determine a change of direction. In an implementation, the walking mode combines pedometer functions with compass measurements without use of accelerometer or gyroscope data.

Figure 5:
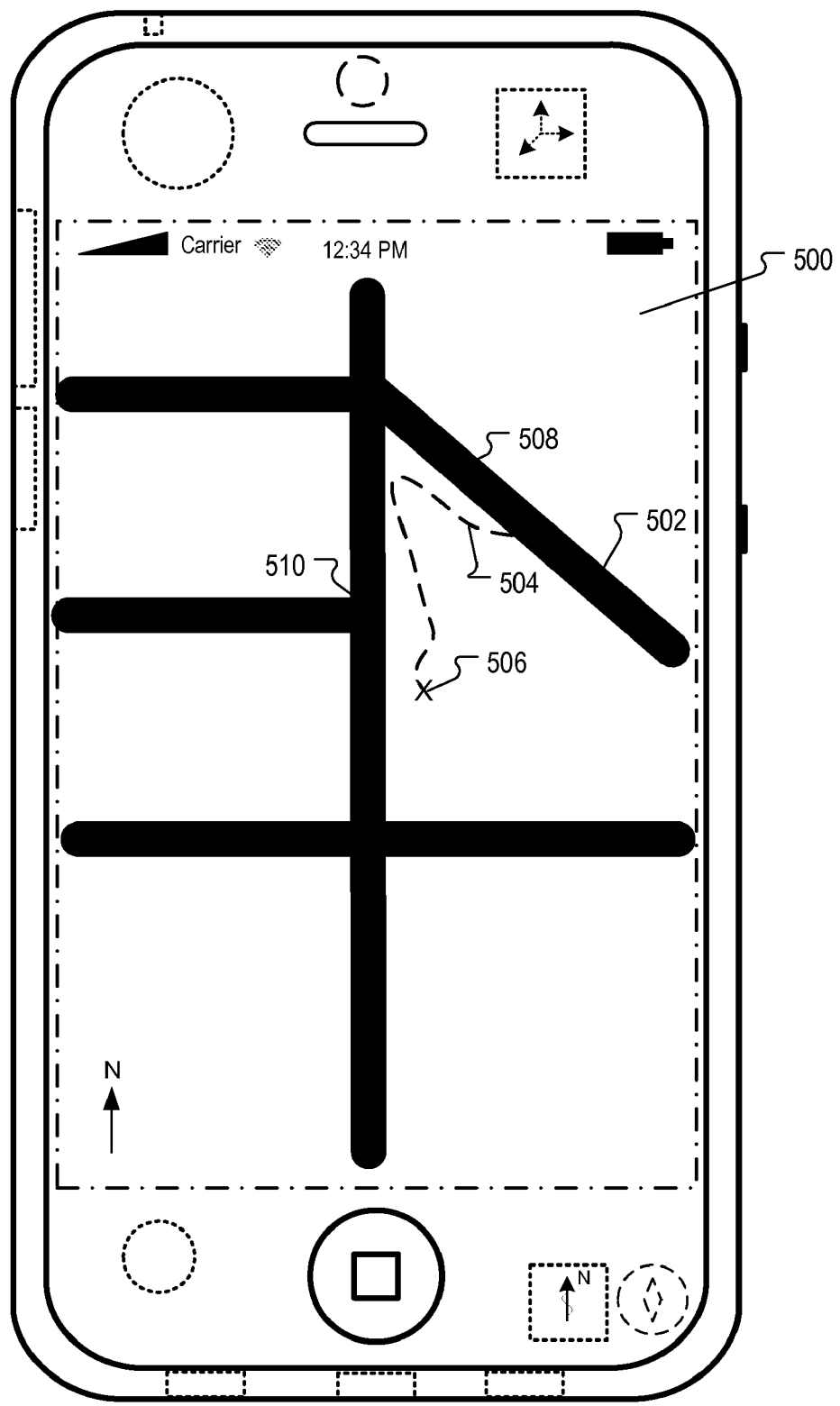
FIG. 5 is a block diagram of an example map display of the mobile device of FIG. 1.

FIG. 5 is a block diagram of an example map display 500 of the mobile device of FIG. 1. The map shows a number of streets and a point of origin 'O' 502. The dashed line 504 represents an example path measured by the device 100 from the origin 502 to a destination 506 measured using dead reckoning with a lock on street setting disabled. The solid line 508 represents an example path measured by the device 100 from the origin 502 to a destination 510 with a lock on street setting enabled.

In the two examples shown, the sensor measurements observed by the device 100 are the same, but the interpretation of the data is different. In the case of the path represented by the line 504, the dead reckoning calculation did not lock the movements of the device to the streets of the map. In the case of the measured path represented by line 508, the device interpreted the sensor data in accordance with the lock on street setting to keep the movement confined to the streets of a map surrounding the fix represented by the origin 502. The lock on street mode can thus provide a more accurate estimate of a user's location if the user restricts her movement to streets and sidewalks along those streets.

Figure 6:
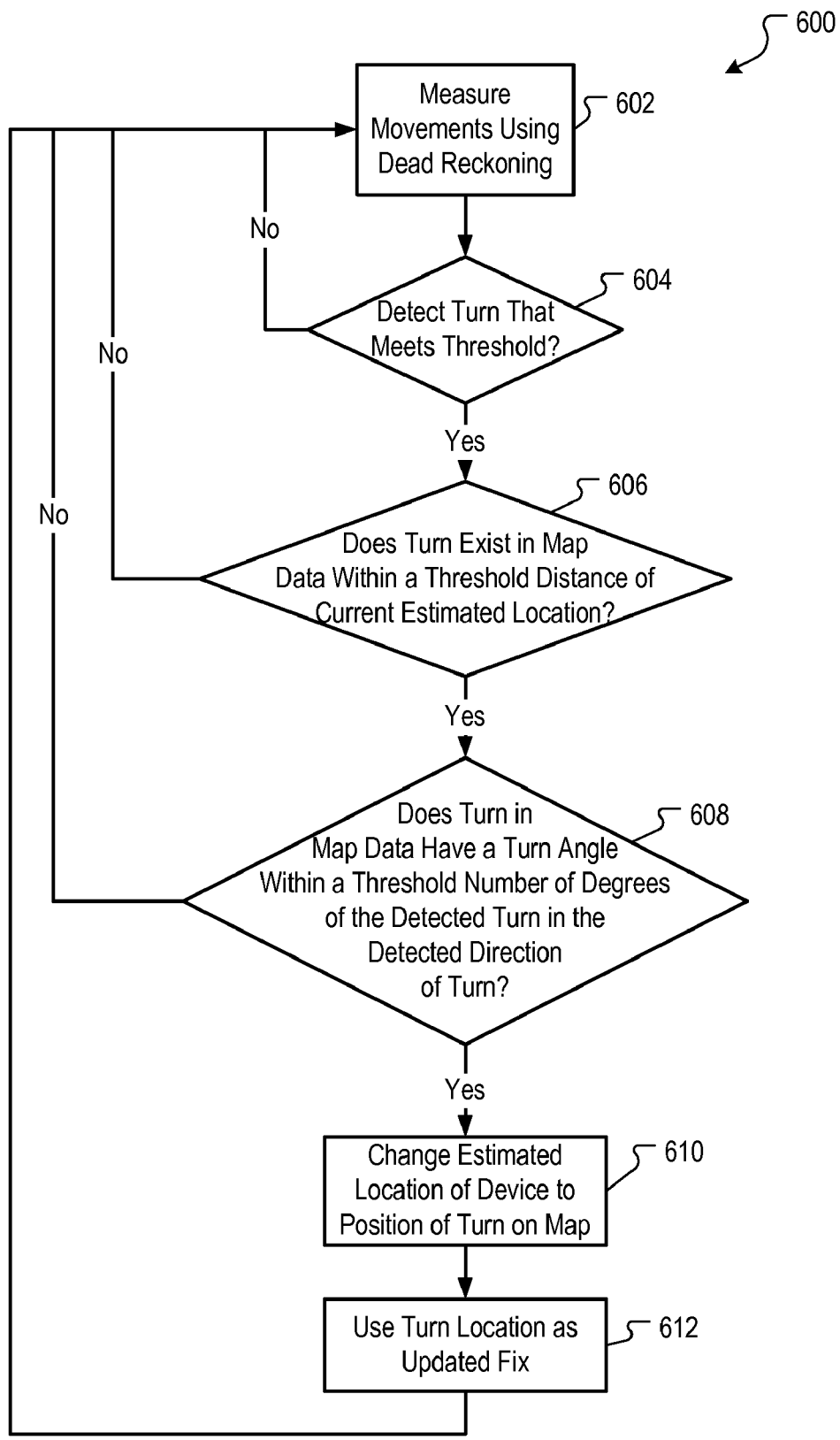
FIG. 6 is a flowchart of an example process for obtaining an updated dead reckoning fix through comparison of a detected turn with map data.

FIG. 6 is a flowchart of an example process 600 for obtaining an updated dead reckoning fix through comparison of a detected turn with map data. The process 600 can, for example, be implemented in a processing device, such as the mobile device 100 of FIG. 1, implementing user processing in software and/or hardware. Movements are measured to estimate a position using dead reckoning (602). For example, movements can be measured by interpreting sensor data in one or more processors of a mobile device 100 where the sensor data is received from one or all of the accelerometer 172, compass 173, and/or gyroscope 175. Using an on board clock, the processor(s) can, for example, interpret the sensor data as movements of the device 100. Using acceleration data, for example, the processor(s) can determine velocity, and position. Alternatively, or in addition, compass data can be used to determine a heading. In some implementations a number of steps and user stride information can be used to determine a distance walked.

Upon the detection of a turn meeting a threshold (such as a minimum angle of turn from a former direction of travel) (604), map data of the area surrounding the current estimated location is checked for turns within a threshold distance of the estimated location (606). For example, upon a processor of the mobile device 100 detecting a turn in sensor data, map data stored in local memory or provided by a networked service can be searched for the existence of such a turn at a candidate location within a threshold distance.

If a turn is found within the threshold distance, the map data is checked to determine if the turn of the map has an angle within a threshold number of degrees of the angle of the detected turn in the direction of the detected turn (608). If a turn is found in the map data that meets these criteria, the estimated location of the device is changed to the location of the turn on the map (610). The turn location is used as an updated fix for dead reckoning measurements made following the detected turn (612). For example, the last known location of a mobile device 100 can be updated to the turn location and used in subsequent dead reckoning location estimates.

Figure 7:
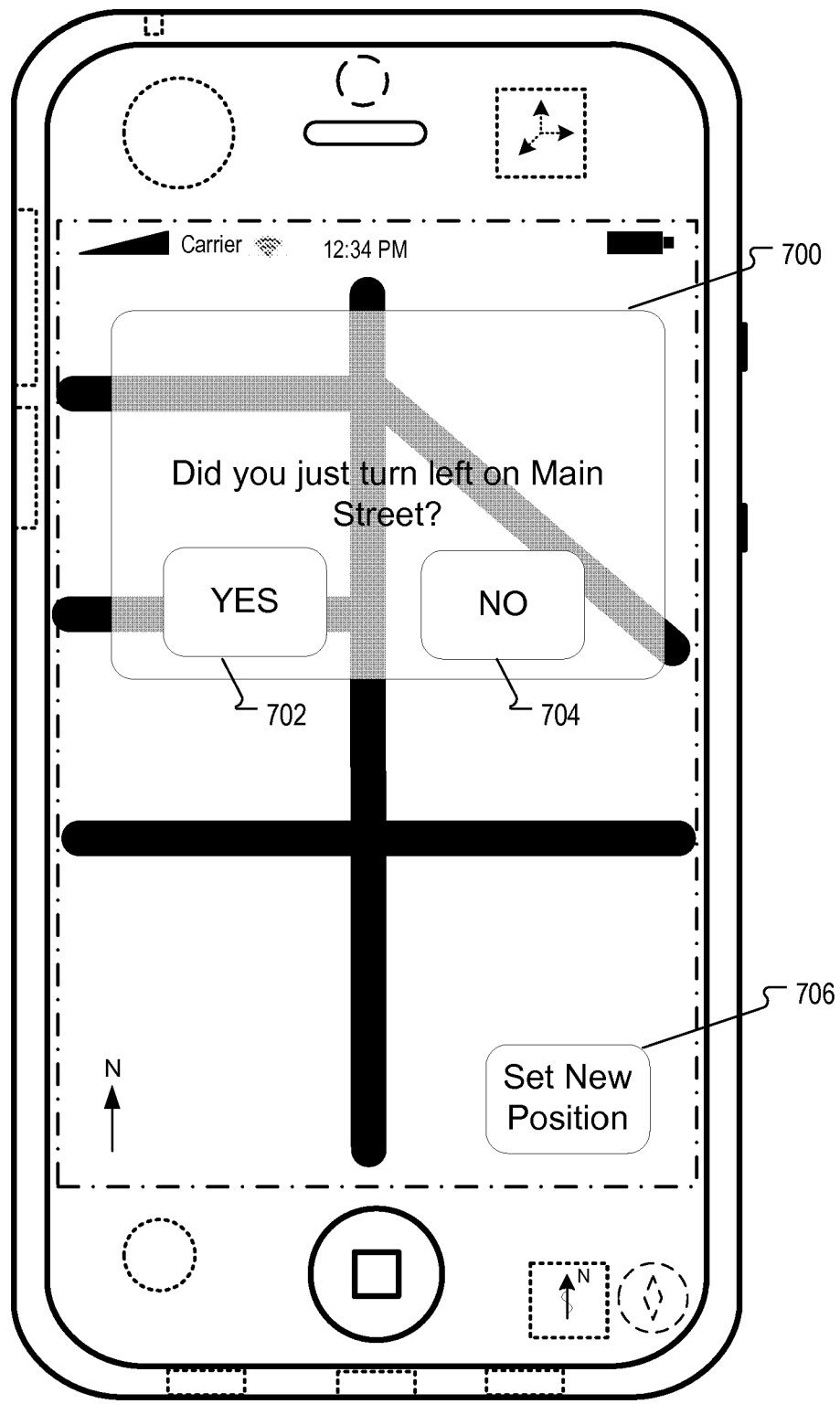
FIG. 7 is a block diagram of an example user feedback prompt of the mobile device of FIG. 1.

In an implementation, an updated fix for dead reckoning position measurement is obtained by gathering input from a user during a journey. In an implementation, input is gathered by prompting the user to answer a map related query. Prompts can occur at periodic intervals of time, distance, or upon the detection of movement meeting threshold criteria. Prompts can be accompanied by an audible or vibrating alert from the device 100. FIG. 7 is a block diagram of an example user feedback prompt 700 of the mobile device of FIG. 1. A feedback prompt 700 includes a question "Did you just turn left on Main Street?" This prompt can be made, for example, on a display of a mobile device 100 accompanied by an alert to indicate the existence of the prompt to a user. If an affirmative answer is given by a user touching "YES" button 702, the intersection of Main Street and the last road the user was traveling on is used as an updated fix for estimating the location of the device using dead reckoning. A user can give a negative answer by touching "NO" button 704.

Figure 8:
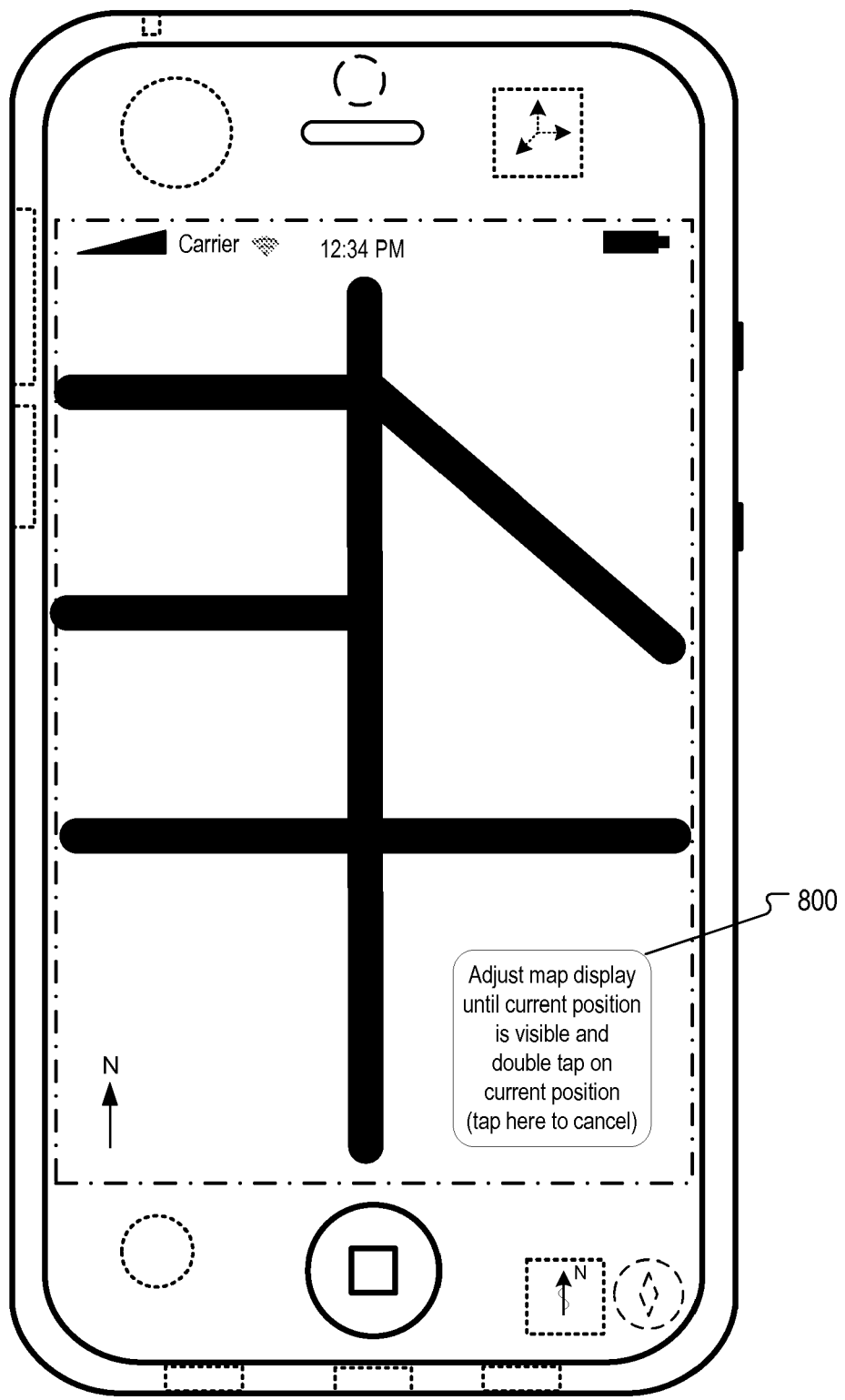
FIG. 8 is a block diagram of an example screen for accepting an updated current location from a user on the mobile device of FIG. 1.

"Set New Position" button 706 is also shown in FIG. 7. In an implementation, a user press of button 706 can cause the example screen of FIG. 8 to be displayed. FIG. 8 is a block diagram of an example screen 800 for accepting an updated current location from a user on the mobile device of FIG. 1. Button 800 prompts the user to adjust the map display, through zooming and panning controls, for example, so that the user's' current location (and that of the mobile device 100) is shown. The button 800 further instructs the user to double tap on the user's current location. Upon the user double tapping, for example, the intersection of $1^{st}$ Ave. and Main Street, this location is used as an updated fix for use in dead reckoning position estimation for later detected movements. In some implementations, the user can enter their current location using a virtual keyboard or other input mechanism.

Figure 9:
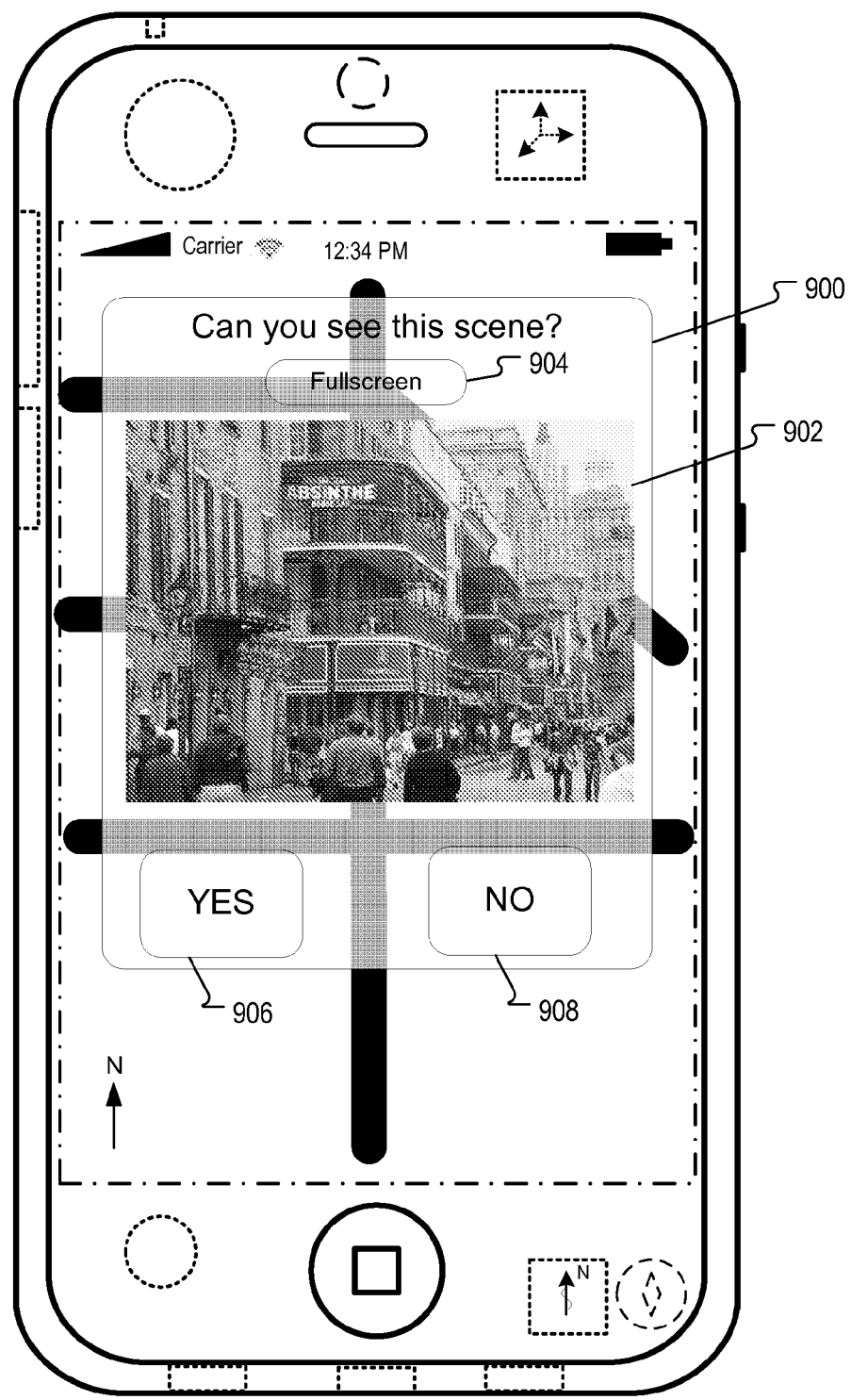
FIG. 9 is a block diagram of an example user feedback prompt including a photograph on the mobile device of FIG. 1.

In an implementation, the device displays a photo of an object or scene that should be viewable from the estimated current location of the device 100 and in some implementations queries the user as to whether the actual object or scene depicted can be seen by the user at her present location. FIG. 9 is a block diagram of an example user feedback prompt 900 including a photograph on the mobile device of FIG. 1. In an implementation, the device displays a photo of an object or scene that should be viewable from the estimated location of the mobile device 100 and queries the user as to whether the scene is viewable from the user's current location. A dialog box 900 includes the question "Can you see this scene?" A user touch of the "Fullscreen" button 904 causes the photo to be displayed in a larger format. The user can touch "Yes" button 906 or "No" button 908 to provide the requested information. An affirmative answer causes the location of the photo to be used as an updated fix.

Photos can be selected for display on the mobile device 100 by searching a database of geo-tagged photos. Geo-tagged photos are photos which have information saved along with the photo that indicates the location at which the photo was taken. A photo is selected for display if the photo matches the estimated location of the device 100 within a threshold distance. Photos can transmitted from a remote location to the device 100 via a network connection, for example, a cellular, IEEE 802.x, or other wireless connection. In an embodiment, photo timestamps are checked to provide photos taken at a similar time of day as the time of display on the device 100 so that, for example, a photo of a scene of an area at night is provided on the device when the device is being used at night. In an implementation, photos having a shorter focal length (wider angle) recorded in the photo's EXIF (exchangeable image file format) information are given priority for display over photos with a longer focal length (telephoto) recorded in the EXIF information to provide a wider field of view to the user.

Figure 10:
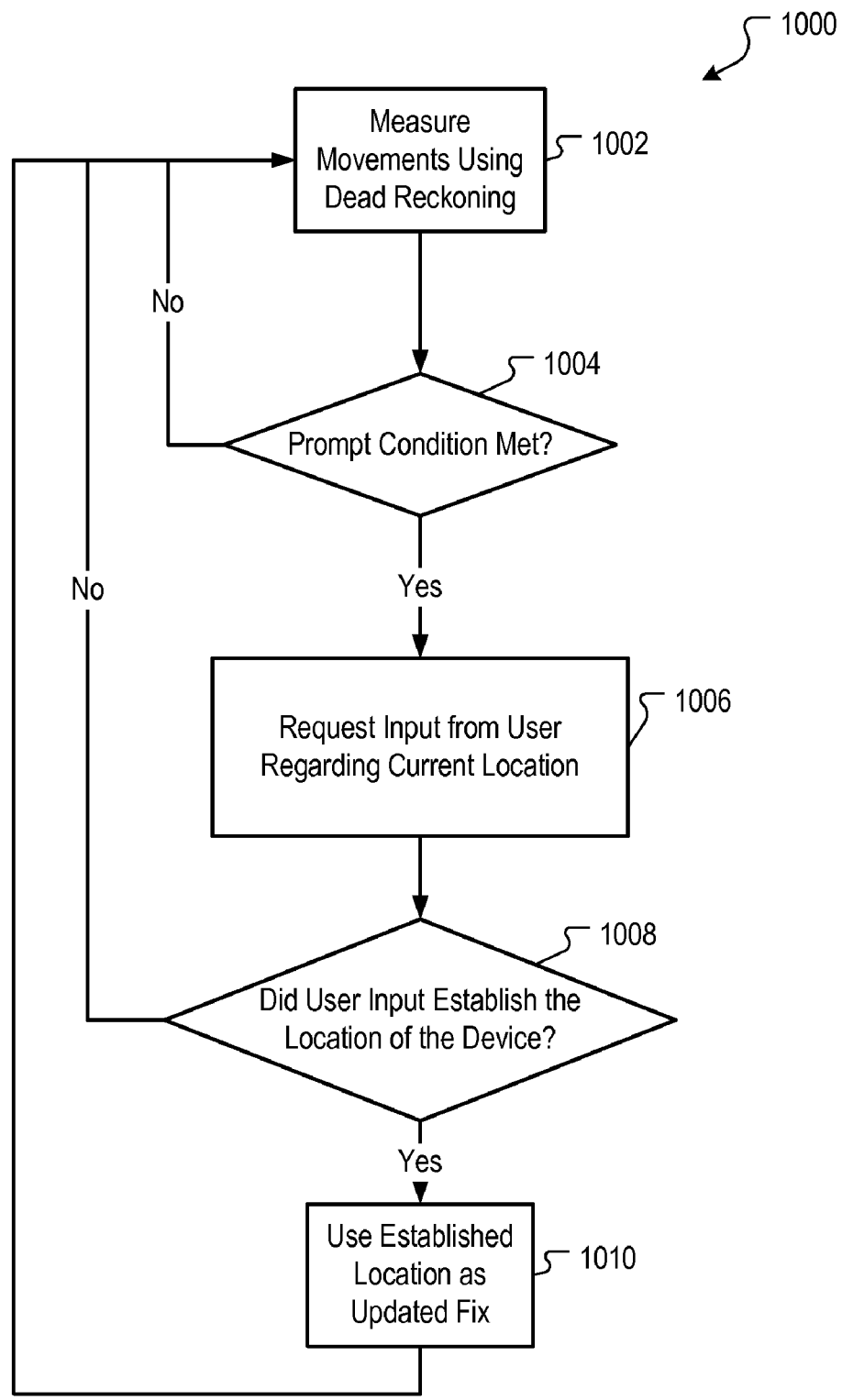
FIG. 10 is a flowchart of an example process for prompting a user to obtain an updated fix of the mobile device of FIG. 1.

FIG. 10 is a flowchart of an example process for prompting a user to obtain an updated fix of the mobile device of FIG. 1. The process 1000 can, for example, be implemented in a processing device, such as the mobile device 100 of FIG. 1, in software and/or hardware. Movements of the device are measured using dead reckoning (1002). Movements can be measured, for example, by one or all of an accelerometer 172, a compass 173, and a gyroscope 175 providing sensor data to one or more processors of the mobile device 100. If a user prompting condition is met (1004), input is requested from the user regarding the current location of the device (1006). User prompting conditions can, for example, include an elapsed time, a measured distance, a detected turn, manual entry of location (e.g., position coordinates), and identification of a nearby geo-tagged photograph. Prompts can, for example, be shown on a display of the mobile device 100 and be accompanied by an alert. If the user input establishes the location of the device (1008) then the established location is used as an updated fix (1010) for dead reckoning estimation of the location of the device for later movements. The updated position can be used, for example, as a last known location of the mobile device 100 for use in subsequent dead reckoning position calculations.

Figure 11:
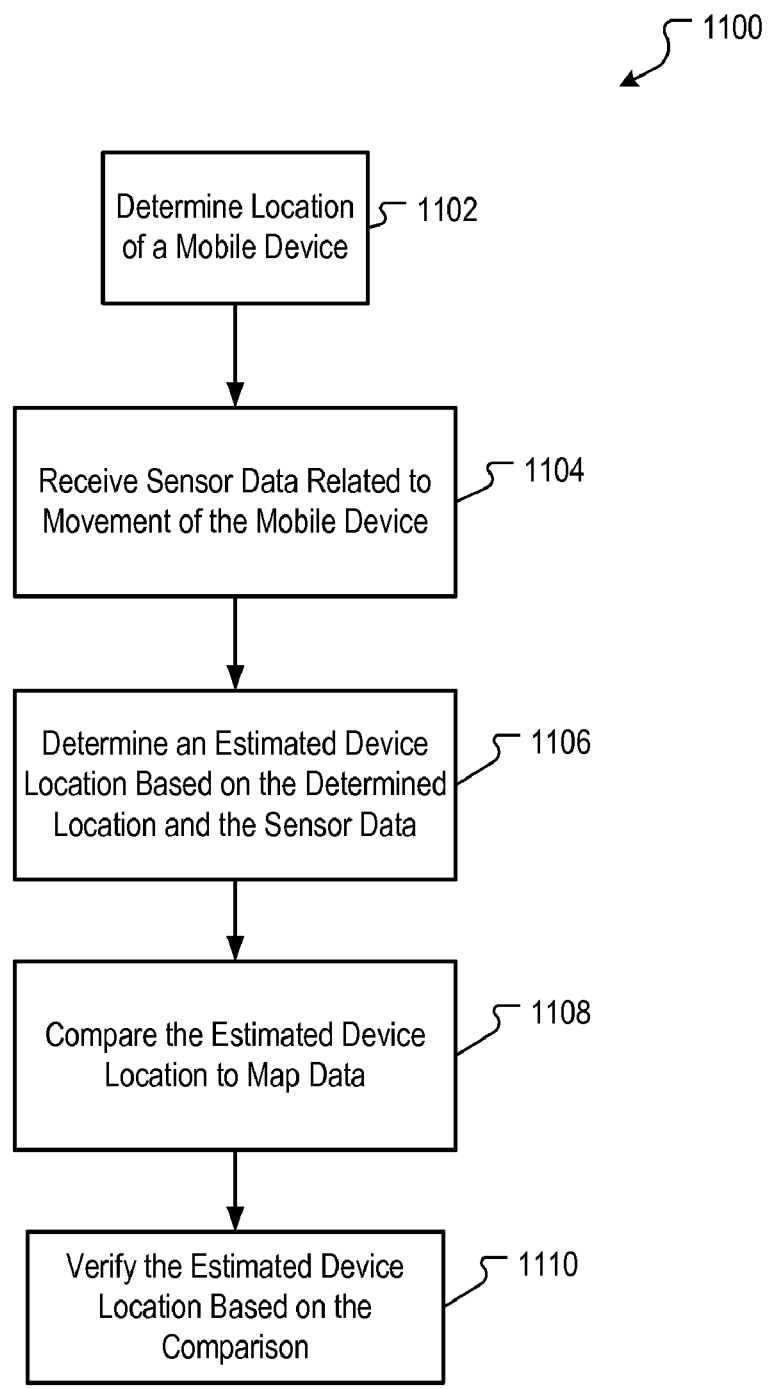
FIG. 11 is a flowchart of an example process for verifying an estimated location of the mobile device of FIG. 1.

FIG. 11 is a flowchart of an example process 1100 for verifying an estimated location of the mobile device of FIG. 1. The location of the mobile device is determined (1102). The location can be determined, for example, via user input, positioning system data, and/or dead reckoning measurements. Sensor data related to movement of the mobile device is received (1104). The sensor data can be received, for example, from sensors such as the accelerometer 172, compass 173, gyroscope 175, and/or footwear impact sensors. An estimated device location is determined based on the location determined in 1102 and the sensor data (1106). The estimated device location can be determined, for example, by performing dead reckoning calculations using the received sensor data to measure movements of the mobile device from the determined location. In an implementation, the estimated device location can be determined based on one or more of a plurality of estimate modes.

The estimated device location is compared to map data (1108). For example, one or more characteristics of the received sensor data can be compared to one or more characteristics of the map data to identify a candidate location. In an implementation, the candidate location is turn in a pathway defined by the map data. In an implementation, the comparison is a comparison of one or more characteristics of a detected turn with one or more turn characteristics of the map data. In an implementation, the comparison is a request for user feedback regarding the candidate location. The estimated device location is verified based on the comparison (1110). The estimated device location can be verified, for example, if one or more characteristics of received sensor data are consistent with one or more characteristics of the candidate location. In an implementation, the estimated device location is verified by a response to a feedback request.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The foregoing descriptions of implementations of the present invention are presented for purposes of illustration and description. They are not intended to be exhaustive or to limit the invention to the precise forms disclosed. Rather, it should be appreciated that many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method, comprising:
storing a position in memory;
receiving sensor data related to movement of a device;
detecting a turn in the movement of the device based on the received sensor data;
comparing the sensor data to map data corresponding to the stored position;
identifying a candidate location defined by the map data based on an estimated current device location and the detected turn, where identifying the candidate location comprises identifying that the candidate location defined by the map data has characteristics consistent with characteristics of the detected turn;
determining the estimated current device location, the determination being based at least in part on the stored position, the received sensor data, and an interpretation of the received sensor data as corresponding to movement along at least one pathway defined by the map data;
prompting the user for confirmation that the estimated current device location corresponds to an actual physical location of the device; and
updating the position stored in memory with the estimated current device location when the user confirms that the estimated current device location corresponds to the actual physical location of the device.

2. The method of claim 1, wherein the pathway is a street.

3. The method of claim 1, wherein the pathway is a sidewalk.

4. The method of claim 1, wherein the motion sensor is an accelerometer.

5. The method of claim 1, wherein the motion sensor is a gyroscope.

6. The method of claim 1, wherein the motion sensor is a compass.

7. The method of claim 1, wherein identifying the candidate location defined by the map data based on the estimated current device location and the detected turn comprises identifying the candidate location defined by the map data if the estimated device location is within a threshold distance of the candidate location.

8. The method of claim 1, wherein identifying the candidate location defined by the map data based on the estimated current device location and the detected turn comprises identifying the candidate location defined by the map data if an angle of the detected turn is within a threshold number of degrees of an angle of a turn at the candidate location defined by the map data.

9. A non-transitory computer program product, encoded on a computer readable medium, operable to cause data processing apparatus to perform operations comprising:
storing a position in memory;
receiving sensor data related to movement of a device;
detecting a turn in the movement of the device based on the received sensor data;
comparing the sensor data to map data corresponding to the stored position;
identifying a candidate location defined by the map data based on an estimated current device location and the detected turn, where identifying the candidate location comprises identifying that the candidate location defined by the map data has characteristics consistent with characteristics of the detected turn;
determining the estimated current device location, the determination being based at least in part on the stored position, received sensor data, and an interpretation of the received sensor data as corresponding to movement along at least one pathway defined by the map data;

prompting the user for confirmation that the estimated current device location corresponds to an actual physical location of the device; and updating the position stored in memory with the estimated current device location when the user confirms that the estimated current device location corresponds to the actual physical location of the device.

10. The computer program product of claim 9, wherein the pathway is a street.

11. The computer program product of claim 9, wherein the pathway is a sidewalk.

12. The computer program product of claim 9, wherein the motion sensor is an accelerometer.

13. The computer program product of claim 9, wherein the motion sensor is a gyroscope.

14. The computer program product of claim 9, wherein the motion sensor is a compass.

15. The computer program product of claim 9, wherein identifying the candidate location defined by the map data based on the estimated current device location and the detected turn comprises identifying the candidate location defined by the map data if the estimated device location is within a threshold distance of the candidate location.

16. The computer program product of claim 9, wherein identifying the candidate location defined by the map data based on the estimated current device location and the detected turn comprises identifying the candidate location defined by the map data if an angle of the detected turn is within a threshold number of degrees of an angle of a turn at the candidate location defined by the map data.

17. A system comprising:
one or more processors; and
a computer program product, encoded on a computer readable medium, operable to cause data processing apparatus to perform operations comprising:
storing a position in memory;
receiving sensor data related to movement of a device;
detecting a turn in the movement of the device based on the received sensor data;
comparing the sensor data to map data corresponding to the stored position;
identifying a candidate location defined by the map data based on an estimated current device location and the detected turn, where identifying the candidate location comprises identifying that the candidate location defined by the map data has characteristics consistent with characteristics of the detected turn;
determining the estimated current device location, the determination being based at least in part on the stored position, received sensor data, and an interpretation of the received sensor data as corresponding to movement along at least one pathway defined by the map data;
prompting the user for confirmation that the estimated current device location corresponds to an actual physical location of the device; and
updating the position stored in memory with the estimated current device location when the user confirms that the estimated current device location corresponds to the actual physical location of the device.

18. The system of claim 17, wherein the pathway is a street.

19. The system of claim 17, wherein the pathway is a sidewalk.

20. The system of claim 17, wherein the motion sensor is an accelerometer.

21. The system of claim 17, wherein the motion sensor is a gyroscope.

22. The system of claim 17, wherein the motion sensor is a compass.

23. The system of claim 17, wherein identifying the candidate location defined by the map data based on the estimated current device location and the detected turn comprises identifying the candidate location defined by the map data if the estimated device location is within a threshold distance of the candidate location.

24. The system of claim 17, wherein identifying the candidate location defined by the map data based on the estimated current device location and the detected turn comprises identifying the candidate location defined by the map data if an angle of the detected turn is within a threshold number of degrees of an angle of a turn at the candidate location defined by the map data.

* * * * *

UNITED STATES PATENT AND TRADEMARK OFFICE
CERTIFICATE OF CORRECTION

PATENT NO.        : 8,204,684 B2                                Page 1 of 1
APPLICATION NO.   : 11/970766
DATED             : June 19, 2012
INVENTOR(S)       : Scott Forstall et al.

It is certified that error appears in the above-identified patent and that said Letters Patent is hereby corrected as shown below:

In Claim 9, column 14, line 51, after "A" delete "non-transitory".

In Claim 9, column 14, line 52, after "computer readable" insert -- non-transitory --.

Signed and Sealed this
Eighteenth Day of December, 2012

David J. Kappos
*Director of the United States Patent and Trademark Office*